United States Patent
George

(10) Patent No.: US 10,798,929 B2
(45) Date of Patent: Oct. 13, 2020

(54) POWERED JIGGING DEVICE WITH MOVABLY MOUNTED MOTOR DRIVING A BALANCE-ADJUSTABLE ROD HOLDER

(71) Applicant: Jonathan D. George, Kenaston (CA)

(72) Inventor: Jonathan D. George, Kenaston (CA)

( * ) Notice: Subject to any disclaimer, the term of this patent is extended or adjusted under 35 U.S.C. 154(b) by 392 days.

(21) Appl. No.: 15/913,356

(22) Filed: Mar. 6, 2018

(65) Prior Publication Data

US 2018/0271078 A1 Sep. 27, 2018

Related U.S. Application Data

(60) Provisional application No. 62/474,374, filed on Mar. 21, 2017.

(51) Int. Cl.
*A01K 91/06* (2006.01)
*A01K 97/10* (2006.01)
*A01K 97/12* (2006.01)

(52) U.S. Cl.
CPC ............ *A01K 91/065* (2013.01); *A01K 97/10* (2013.01); *A01K 97/12* (2013.01)

(58) Field of Classification Search
CPC ....... A01K 91/065; A01K 97/12; A01K 97/10
See application file for complete search history.

(56) References Cited

U.S. PATENT DOCUMENTS

| 3,529,376 | A | * | 9/1970 | Parmeson | A01K 85/00 43/42.06 |
|---|---|---|---|---|---|
| 3,550,302 | A | * | 12/1970 | Creviston | A01K 91/065 43/16 |
| 4,951,411 | A | * | 8/1990 | Ecker | A01K 91/065 43/19.2 |
| 4,974,358 | A | * | 12/1990 | King | A01K 91/065 43/26.1 |
| 5,056,255 | A | * | 10/1991 | Campbell | A01K 91/065 43/15 |
| 5,437,121 | A | * | 8/1995 | Chacon, Jr. | A01K 91/065 43/19.2 |
| 5,473,835 | A | * | 12/1995 | Emett | A01K 91/065 43/19.2 |
| 5,570,534 | A | * | 11/1996 | Ford | A01K 91/065 43/15 |
| 6,363,650 | B1 | * | 4/2002 | Beeler | A01K 91/065 43/19.2 |

(Continued)

*Primary Examiner* — Monica L Barlow
*Assistant Examiner* — Aaron M Rodziwicz
(74) *Attorney, Agent, or Firm* — Kyle R. Satterwaite; Ryan W. Dupuis; Ade & Company Inc.

(57) ABSTRACT

A powered jigging device has a support frame, and a rod carrier that pivots in a first working plane while holding a fishing rod. A motor carrier is movably coupled to the support frame in a manner allowing constrained motion of the motor carrier in a parallel second working plane. A motor on the motor carrier drives an eccentric about a rotational axis of the motor. The eccentric is engaged with a mating feature the rod carrier at a position radially spaced from the pivot axis such that said driven revolution of the eccentric normally pivots the rod carrier upward and downward about said pivot axis, while the available constrained motion between the motor carrier and the support frame accommodates freewheeling operation of the motor when a caught fish pulls a front end of the rod carrier into a lowered position via tension in the fishing line.

17 Claims, 17 Drawing Sheets

(56) References Cited

U.S. PATENT DOCUMENTS

| | | | |
|---|---|---|---|
| 6,722,078 B1* | 4/2004 | Kelley | A01K 91/065 43/15 |
| 8,453,371 B1* | 6/2013 | Sullivan | A01K 97/125 43/19.2 |
| 8,919,029 B1* | 12/2014 | Rosocha | A01K 91/065 43/19.2 |
| 9,179,657 B1* | 11/2015 | Winter | A01K 87/00 |
| 9,629,356 B1* | 4/2017 | Frierson, II | A01K 91/065 |
| 2001/0049899 A1* | 12/2001 | Keller | A01K 91/065 43/19.2 |
| 2006/0032105 A1* | 2/2006 | Modglin | A01K 91/065 43/19.2 |
| 2006/0248778 A1* | 11/2006 | Ward | A01K 97/11 43/19.2 |
| 2007/0011934 A1* | 1/2007 | Rayfield | A01K 97/125 43/17 |
| 2007/0011937 A1* | 1/2007 | Roh | A01K 97/10 43/19.2 |
| 2007/0028504 A1* | 2/2007 | Cameron | A01K 97/10 43/21.2 |
| 2007/0266615 A1* | 11/2007 | Norman | A01K 91/065 43/19.2 |
| 2008/0155881 A1* | 7/2008 | Carnevali | A01K 97/10 43/21.2 |
| 2009/0084019 A1* | 4/2009 | Carnevali | F16M 11/2078 43/21.2 |
| 2011/0225870 A1* | 9/2011 | Carnevali | A01K 97/10 43/21.2 |
| 2015/0223440 A1* | 8/2015 | Schmaus | A01K 91/065 43/4.5 |
| 2015/0359210 A1* | 12/2015 | Rossi | A01K 97/10 43/21.2 |
| 2016/0037762 A1* | 2/2016 | Thomas | A01K 97/10 248/636 |
| 2017/0251654 A1* | 9/2017 | Brooks | A01K 97/10 |
| 2017/0303522 A1* | 10/2017 | Reiter | A01K 97/10 |
| 2018/0360015 A1* | 12/2018 | Garcia | A01K 97/10 |

* cited by examiner

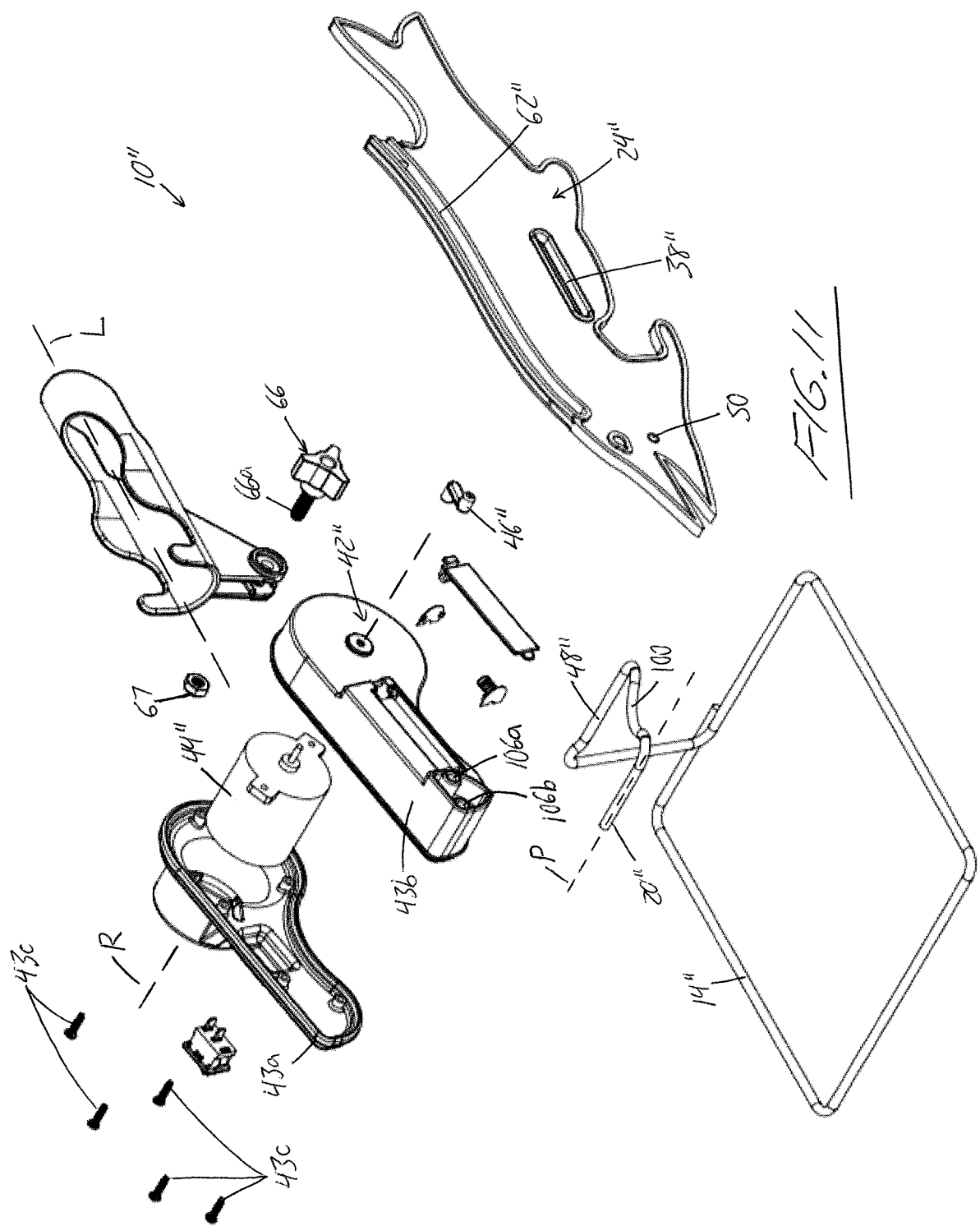

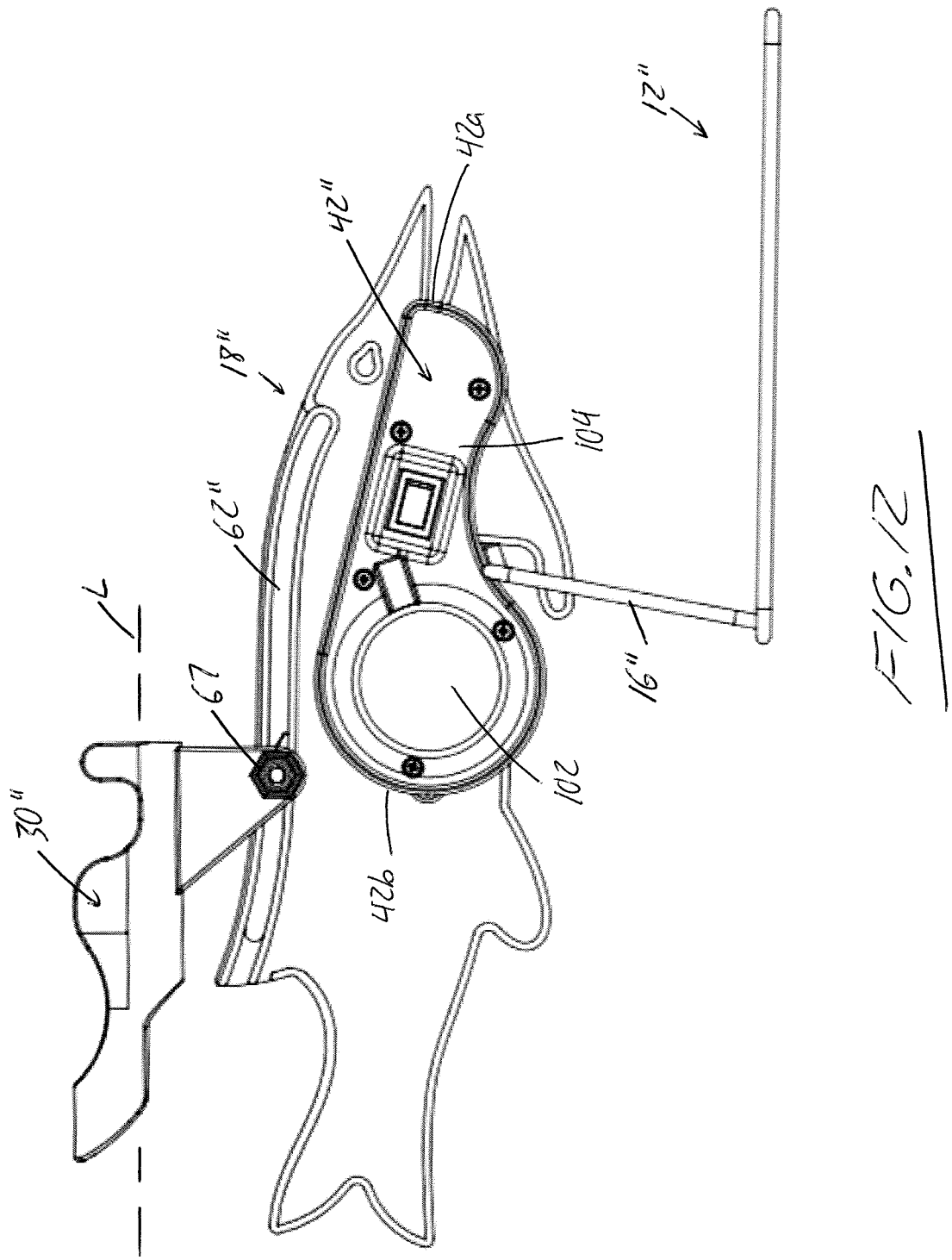

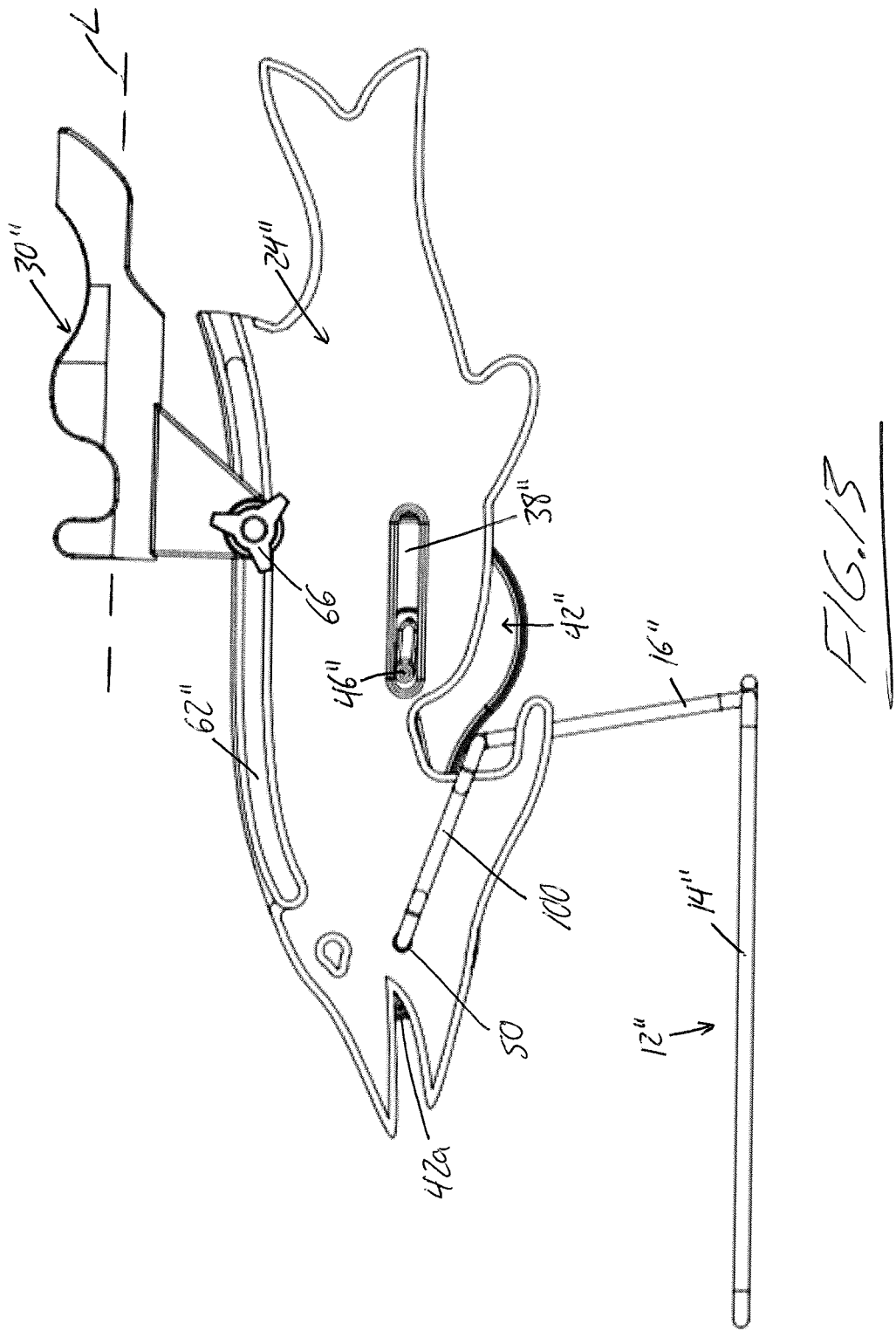

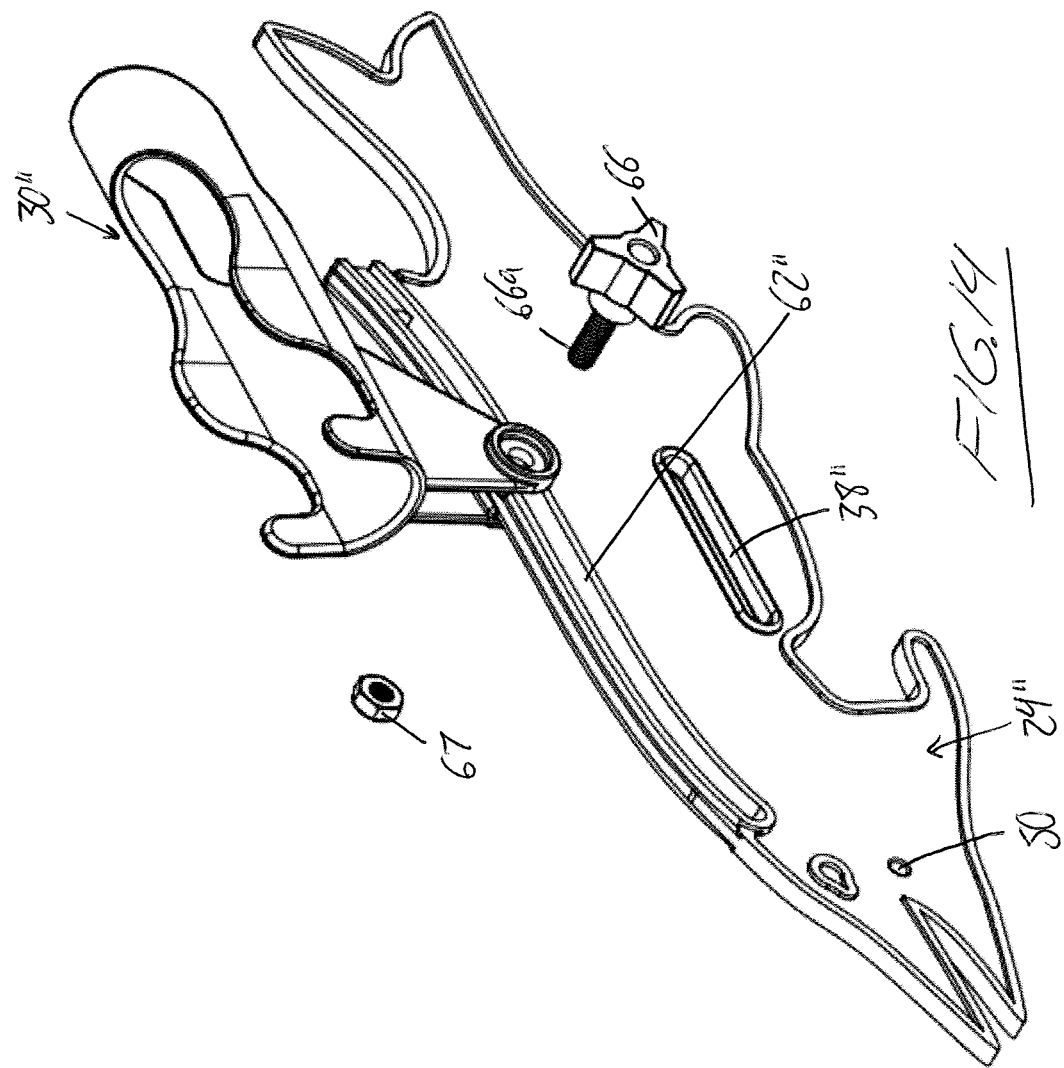

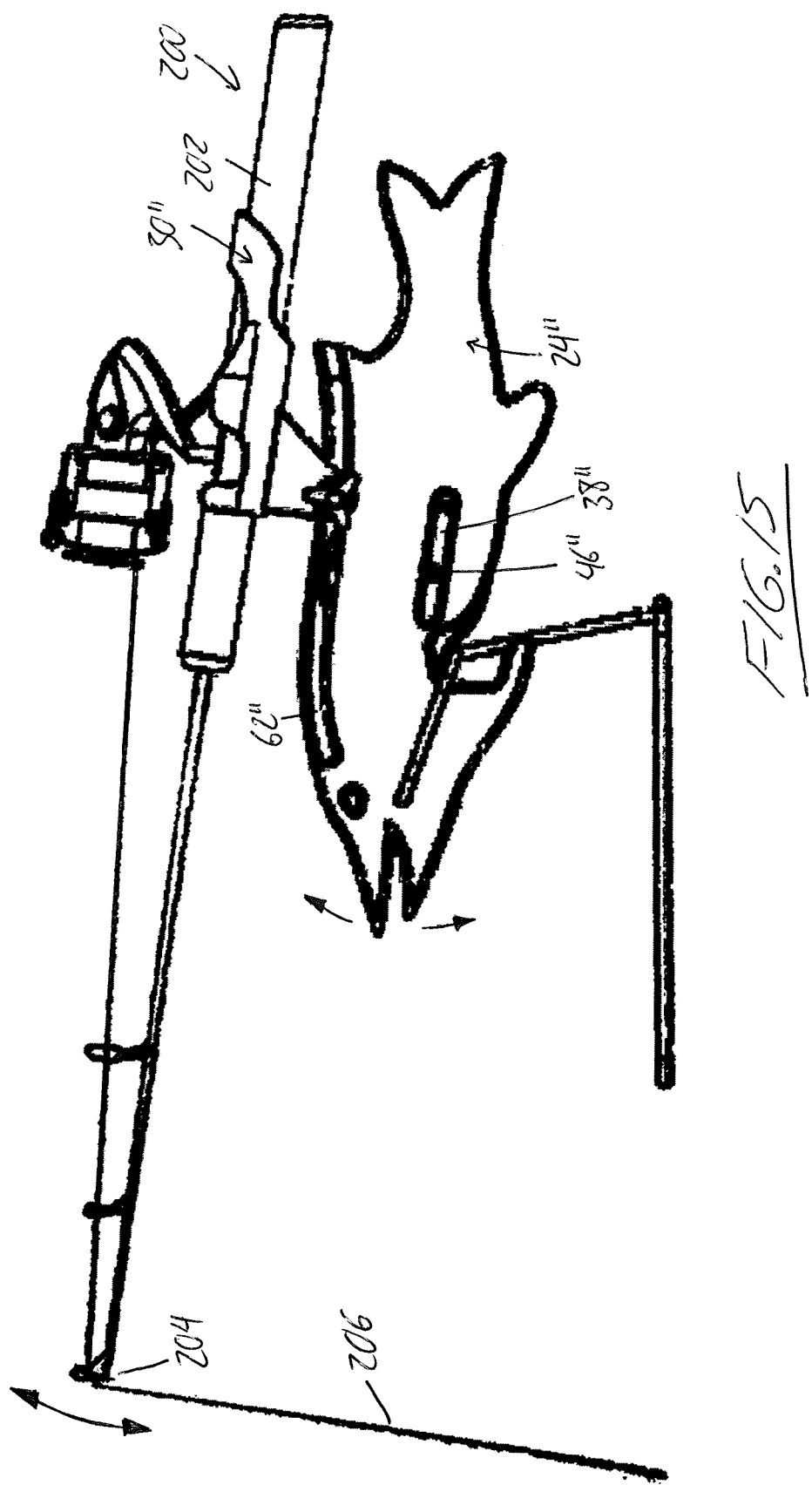

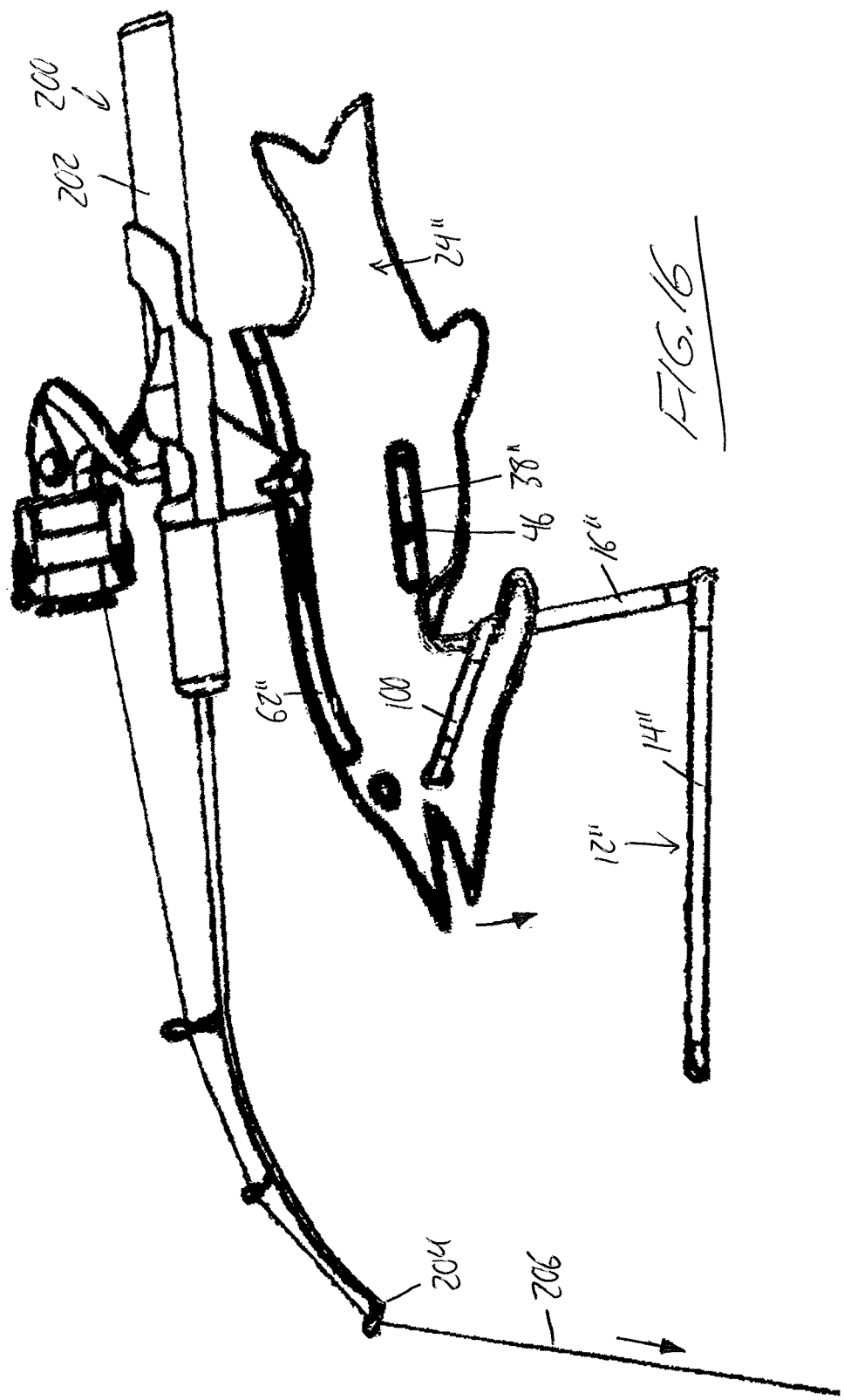

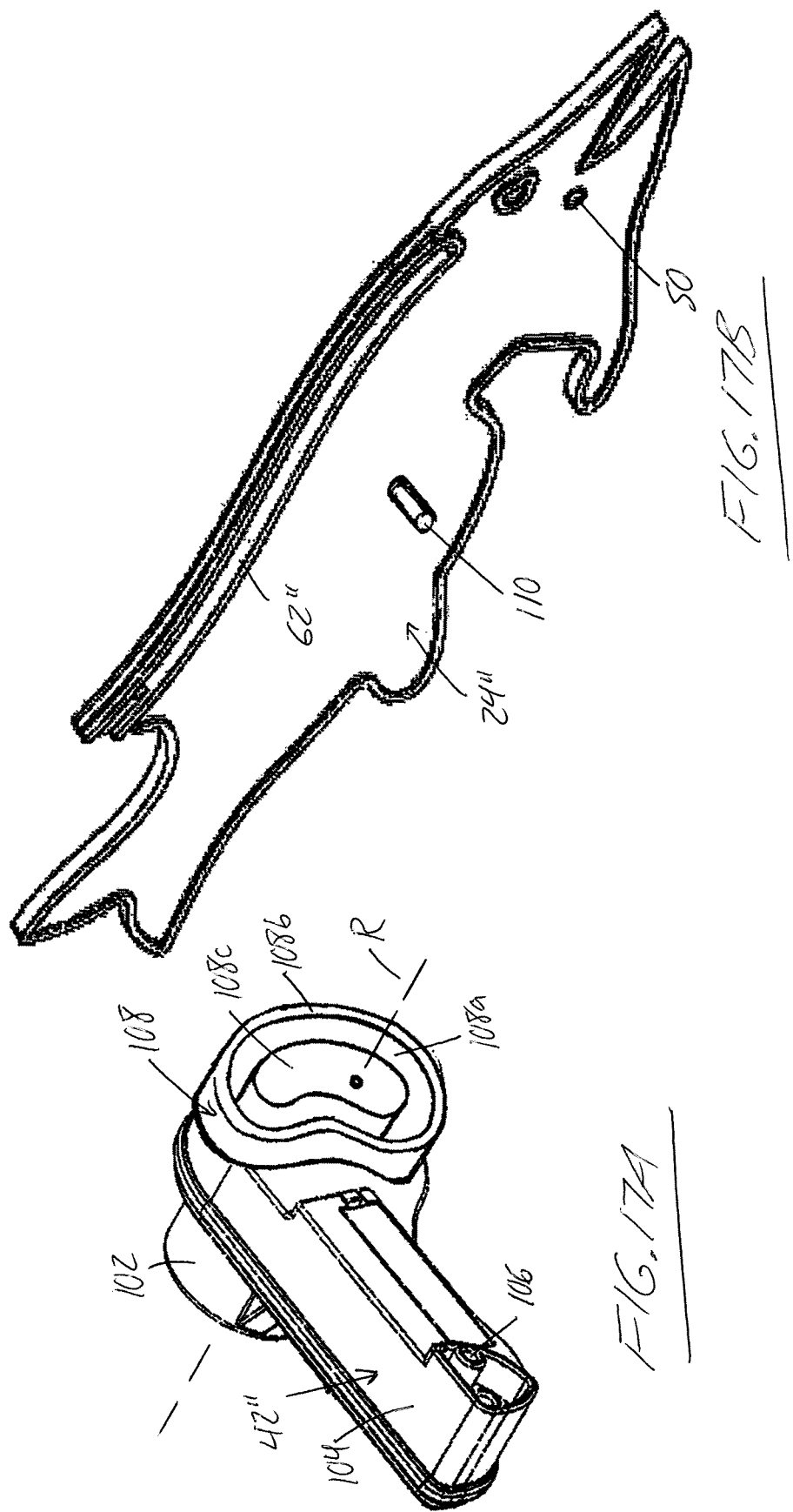

POWERED JIGGING DEVICE WITH MOVABLY MOUNTED MOTOR DRIVING A BALANCE-ADJUSTABLE ROD HOLDER

CROSS-REFERENCE TO RELATED APPLICATIONS

This application claims benefit under 35 U.S.C. 119(e) of U.S. Provisional Application No. 62/474,374, filed Mar. 21, 2017, the entirety of which is incorporated herein by reference.

FIELD OF THE INVENTION

The present invention relates generally to fishing accessories, and more particularly to a powered jigging device for supporting and automatically jigging a fishing rod.

BACKGROUND

Motor driven fishing rod jigging devices has been previously proposed in the art. Of those known to the applicant, the most relevant to that of the present invention is the jigging device disclosed in U.S. Pat. No. 8,453,371, where a fishing rod carrier is pivotally mounted to an upright support and a motor mounted at a fixed location on the upright support drives a multi-bar linkage coupled between a motor driven eccentric and a lower front corner of the rod carrier. During normal operation, the motor drives a reciprocal nodding action of the rod carrier about its pivot axis. When a fish bites the line and pulls on same, the introduced line tension pulls the front end of the rod carrier down, but the motor is allowed to continue operation, as the movement of the motor eccentric relative to the held-down rod holder is accommodated by the multi-bar linkage.

Applicant discloses herein an alternate design of a motor-driven jigging device that likewise allows ongoing motor operation when a fish is caught, but accomplishes this in unique and advantageous way while also enabling improved operational efficiency.

SUMMARY OF THE INVENTION

According to one aspect of the invention there is provided a powered jigging device comprising:
 a support frame;
 a rod carrier having, or being configured to receive, a fishing rod thereon in a position reaching along a longitudinal axis, said rod carrier being pivotally mounted to the support frame for upward and downward pivoting of the rod carrier in a first working plane about a pivot axis transverse to the longitudinal axis, whereby the pivoting of the rod carrier jigs a fishing line of said rod up and down;
 a motor carrier movably coupled to the support frame in a manner allowing constrained motion relative thereto in a second working plane parallel to said first working plane;
 a motor mounted to said motor carrier;
 an eccentric coupled to an output of the motor for driven revolution of said eccentric about a rotational axis of said motor;
 wherein the eccentric is engaged with a mating feature on the rod carrier at a position radially spaced from the pivot axis such that said driven revolution of the eccentric normally pivots the rod carrier upward and downward about said pivot axis, while the available constrained motion between the motor carrier and the support frame accommodates ongoing operation of the motor when a caught fish pulls a front end of the rod carrier into a lowered position via tension in the fishing line.

Preferably there is a balance adjustment mechanism on the rod carrier by which the fishing rod is relocatable relative to the pivot axis to achieve a balanced state of the rod carrier and the fishing rod about the pivot axis.

Preferably at least a portion of the rod carrier is relocatable relative to the pivot axis to achieve a balanced state of the rod carrier and the fishing rod about the pivot axis.

In some embodiments, the rod carrier comprises a base member carrying the mating feature with which the eccentric is engaged, and a rod holder carried by the base, the rod holder being relocatable to and lockable at different positions on the base to relocate the fishing rod along the longitudinal axis.

Preferably the base of the rod carrier comprises a track along which the rod holder is slidable, and the rod holder comprises a clamp operable to releasably clamp the rod holder to the base of the rod holder at selectable locations along said track. In such embodiments, the track may be, for example, a rail defined atop the base of the rod carrier or an adjustment slot defined in the base of the rod carrier below an upper perimeter edge thereof.

In other embodiments, an entirety of the rod carrier is relocatable relative to the support frame to shift said rod carrier relative to the pivot axis.

In some embodiments, the rod carrier comprises an elongated slot therein through the pivot axis passes.

In such embodiments, there may be a releasable clamping mechanism for releasably clamping rod carrier in place on the pivot axis at a selected location along said elongated slot.

In one embodiment, the releasable clamping mechanism comprises:
 a bolt member having an externally threaded shaft, an enlarged shoulder projecting outward from said threaded shaft and an axial bore through which a pivot pin passes to define the pivot axis; and
 a locking nut threaded on the threaded shaft for clamping the rod carrier against the enlarged shoulder of the bolt member under advancement of the locking nut on the threaded shaft of the bolt member.

In one embodiment, the rod carrier comprises a wire frame rod carrier, a portion of which defines an elongated loop delimiting the elongated slot.

In embodiments with a wireframe rod carrier defining an elongated loop delimiting an elongated slot through which the pivot axis passes, the rod carrier may be adjustable in position by shifting the elongated closed loop of the wire frame rod carrier back and forth across the pivot axis.

In some embodiments, the elongated slot has a length exceeding a diameter of an orbital path of the eccentric about the pivot axis.

In some embodiments, the motor carrier is pivotally coupled to the support frame for pivotal movement about the same pivot axis as the rod carrier.

In such instances, the motor carrier may be constrained to only said pivotal movement, and multiple pivot pin holes may be provided the motor carrier to enable selective pinning of the motor carrier to the support frame at different relative positions thereto and thereby change a radial distance from the pivot axis to the motor's rotational axis in order to vary an amplitude of the upward and downward pivoting of the rod carrier.

In another embodiments, the motor carrier is pivotal about a second pivot axis that is discrete from said first pivot axis, said motor carrier having a slot therein through which the second pivot axis passes, where said motor carrier is pivotable about said second pivot axis and displaceable back and forth in radial directions relative to said second pivot axis.

The rod carrier and the fishing rod are preferably balanced about said pivot axis to minimize loading of the motor during said normal upward and downward pivoting of the rod carrier.

In some embodiments, the eccentric comprises an eccentric pin and the mating feature of the rod carrier comprises an opening the rod carrier in which the eccentric pin is received. In such instances, the opening in the rod carrier may be an elongated slot, or may be one of a plurality of holes, each of which is sized for selective receipt of the eccentric pin therein and is positioned at a different radial distance from the pivot axis of the rod carrier, whereby the amplitude of the upward and downward pivoting of the rod carrier is adjustable by selection from among said plurality of holes.

Alternatively, the eccentric may be a cam track member that defines a constrained pathway around the rotational axis of the motor, in which case the mating feature on the rod carrier is a follower engaged in the constrained pathway of said cam track member.

In one embodiment, the support frame comprises a bent wireframe, integral sections of which define a base, an upright support standing upright from said base, and a pivot pin on which the rod carrier is pivotally received.

In such instance, preferably the motor carrier is pivotally received on the same pivot pin as the rod carrier.

Preferably the bent wireframe also defines a support bar on which the motor carrier is normally seated.

According to a second aspect of the invention, there is provided a method of using the device and fishing rod above by:

balancing the fishing rod and the rod carrier into a balanced state about the pivot axis;

operating the motor to perform said upward and downward pivoting of the rod carrier to thereby pivot the fishing rod up and down and jig the fishing line, during which the balanced state minimizes operational loads on the motor.

On catching a fish, a tensioned state is introduced to the fishing line, which pulls the front end of the rod carrier down into the lowered position, whereupon relative movement between the motor carrier and the support frame accommodates ongoing operation of said motor while the lowered position of the rod carrier is held by the tensioned state of the fishing line.

According to a third aspect of the invention, there is provided a method of using the device and fishing rod above by operating the motor to perform said upward and downward pivoting of the rod carrier to thereby pivot the fishing rod up and down and jig the fishing line until a fish is caught, which introduces a tensioned state of the fishing line that pulls the front end of the rod carrier down into the lowered state, and using relative movement between the motor carrier and the support frame to accommodate ongoing operation of said motor while said lowered state of the rod carrier is held by the tensioned state of the fishing line.

BRIEF DESCRIPTION OF THE DRAWINGS

One embodiment of the invention will now be described in conjunction with the accompanying drawings in which:

FIG. 11 is an exploded perspective view of a third embodiment jigging device with a bent wire frame and a rod carrier having a fish-shaped base.

FIG. 12 is an assembled side elevational view of the third embodiment jigging device.

FIG. 13 is an opposing side elevational view of the jigging device of FIG. 12.

FIG. 14 is a perspective view of the rod carrier of the third embodiment jigging device with a clamping mechanism thereof in an exploded state.

FIG. 15 is a side elevational view of the third embodiment jigging device a normal mode of operation prior to a fish being hooked.

FIG. 16 is a side elevational view of the third embodiment jigging device in a freewheeling mode of operation after a hooked fish has pulled the fishing line taught and tipped the rod carrier down.

FIGS. 17A and 17B are perspective views of a motor unit and fish-shaped rod carrier of a fourth embodiment jigging device that it otherwise identical to the third embodiment.

In the drawings like characters of reference indicate corresponding parts in the different figures.

DETAILED DESCRIPTION

Figure 1:
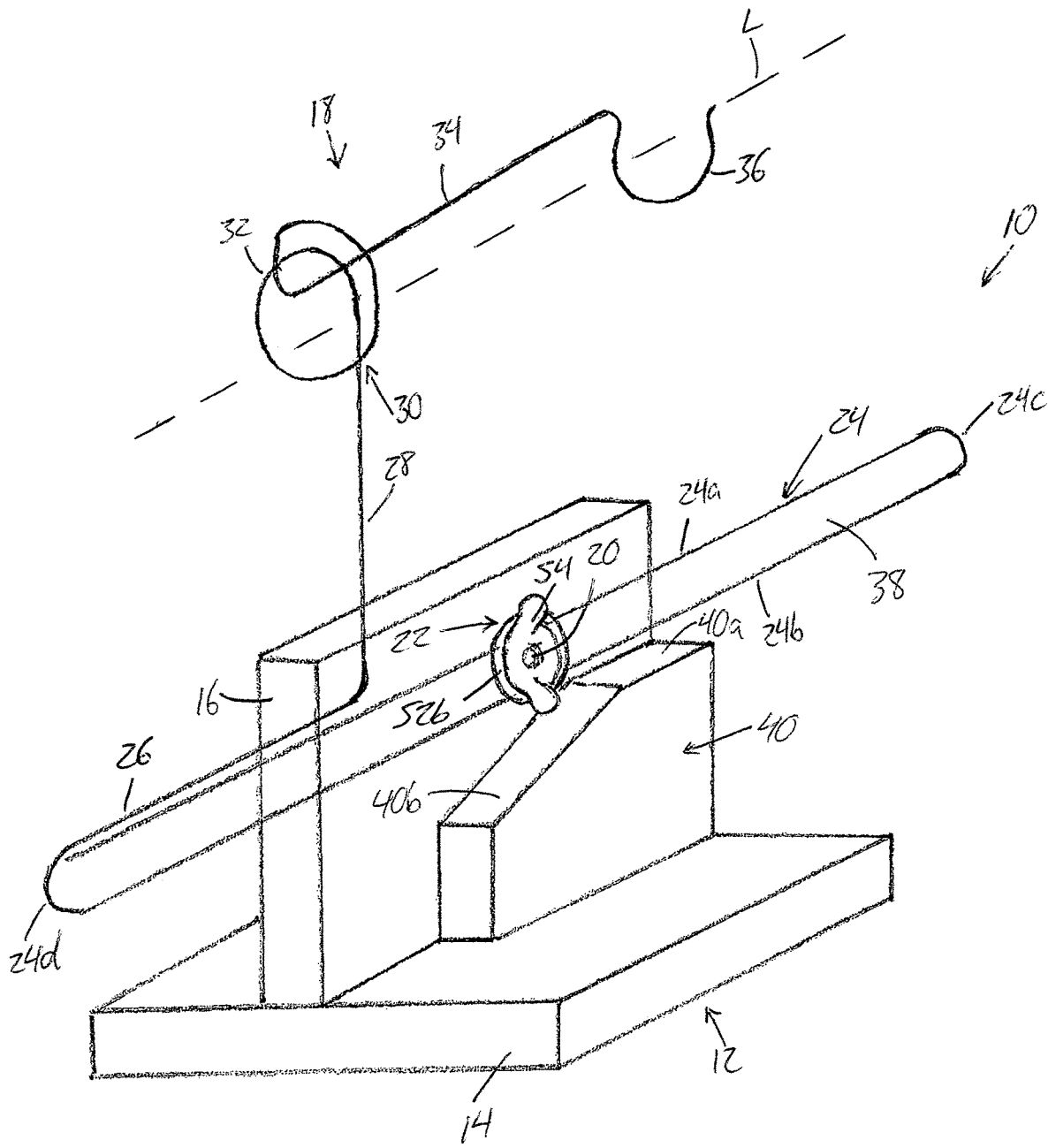
FIG. 1 is a rear right side perspective view of a first embodiment jigging device according to the present invention, prior to installation of a removable motor unit thereof.

FIG. 1 illustrates a partially assembled jigging device 10 according to a first embodiment of the present invention. The device features a support frame 12 having a flat base panel 14, and an upright support wall 16 standing perpendicularly upward from the base panel 14 at a central mid plane thereof. The drawings illustrate the device in a normal working position, where the base panel 14 is seated atop a horizontal support surface (not shown) so that the upright support wall 16 stands vertically upright. On a first side of the upright support wall 16, a rod carrier 18 is pivotally carried on the support wall 16 by a horizontal pivot pin 20 passing perpendicularly therethrough near the top edge of the support wall at an elevated location above the base panel. A selectively releasable clamping mechanism 22 normally holds the rod carrier 18 in place on the axis of the pivot pin 20 so that the rod carrier 18 cannot slide back and forth across the pivot pin axis. The clamping mechanism 22 also prevents the rod carrier 18 from sliding axially off the end of the pivot pin 20. Further detail of the illustrated clamping mechanism is provided herein further below.

The rod carrier 18 of the first embodiment is a wireframe rod carrier featuring a singular piece of metal wire bent into a predetermined shape. The wire has sufficient rigidity to normally maintain this predetermined shape in the absence of notable external bending forces. A lower portion of the rod carrier 18 features an elongated loop 24 defined by two linearly parallel spans of wire 24a, 24b disposed one over the other in a first vertical working plane, and interconnected at a front end 24c by a 180-degree arcuate bend. At the opposing rear end 24d of the loop 24, a second 180-degree arcuate bend extends upwardly from the lower linear span 24b, but instead of connecting back up with the upper linear span 24a, integrally joins with a shorter linear span 26 that runs partially along the upper linear span 24a, and terminates short of the clamping mechanism 20 and pivot pin 20. At this terminal front end of wire span 26, an upright wire span 28 stands perpendicularly upright from wire span 26 to an elevated height above the lower loop 24. Here a rod holder section 30 of the rod carrier is defined to receive the handle of a conventional fishing rod. The rod holder section 30 features a coil 32 that encircles a longitudinal axis L at the top end of upright wire span 30. A linear segment 34 of the rod holder section reaches forwardly along the longitudinal axis L at a position laterally offset therefrom, and an upwardly-opening U-shaped cradle 36 reaches laterally from the front end of the linear segment 34 to the same side thereof as the coil 32, and is aligned therewith so as to arc around the same longitudinal axis L To support a fishing rod on the wire frame carrier, the free rear end of a fishing rod handle is passed rearwardly through the coil 32, and a forward portion of the handle is laid atop the U-shaped cradle 36, whereby the fishing rod reaches forwardly from the rod holder section along the longitudinal axis. The coil 32 and cradle 36 of the rod holder are spaced apart in a same forward-rearward direction as the front and rear ends of the lower loop 24, though as shown, the longitudinal axis on which they are spaced need not be parallel to the lower loop's direction of elongation, and may be inclined at an acute angle relative thereto so that the fishing rod is obliquely inclined relative to the lower loop 24. The pivot pin 20 passes horizontally through the elongated slot-like opening 38 opening delimited by the lower loop 24 of the wire frame rod carrier. The clamping mechanism 20 is pivotal about the pin 20, whereby the entire rod carrier 18 and the fishing rod carried thereby are pivotal in the first vertical working plane. Each end of the rod carrier is thus pivotable upwardly and downwardly about the pivot pin 20. Pivotal directionality of the rod carrier 18 is described herein in relation to the movement of the front end 24c thereof. Accordingly, an upstroke of the rod carrier refers to an upward movement of the rod carrier's front end, while a downstroke of the rod carrier refers to downward movement of the rod carrier's front end.

Figure 3:
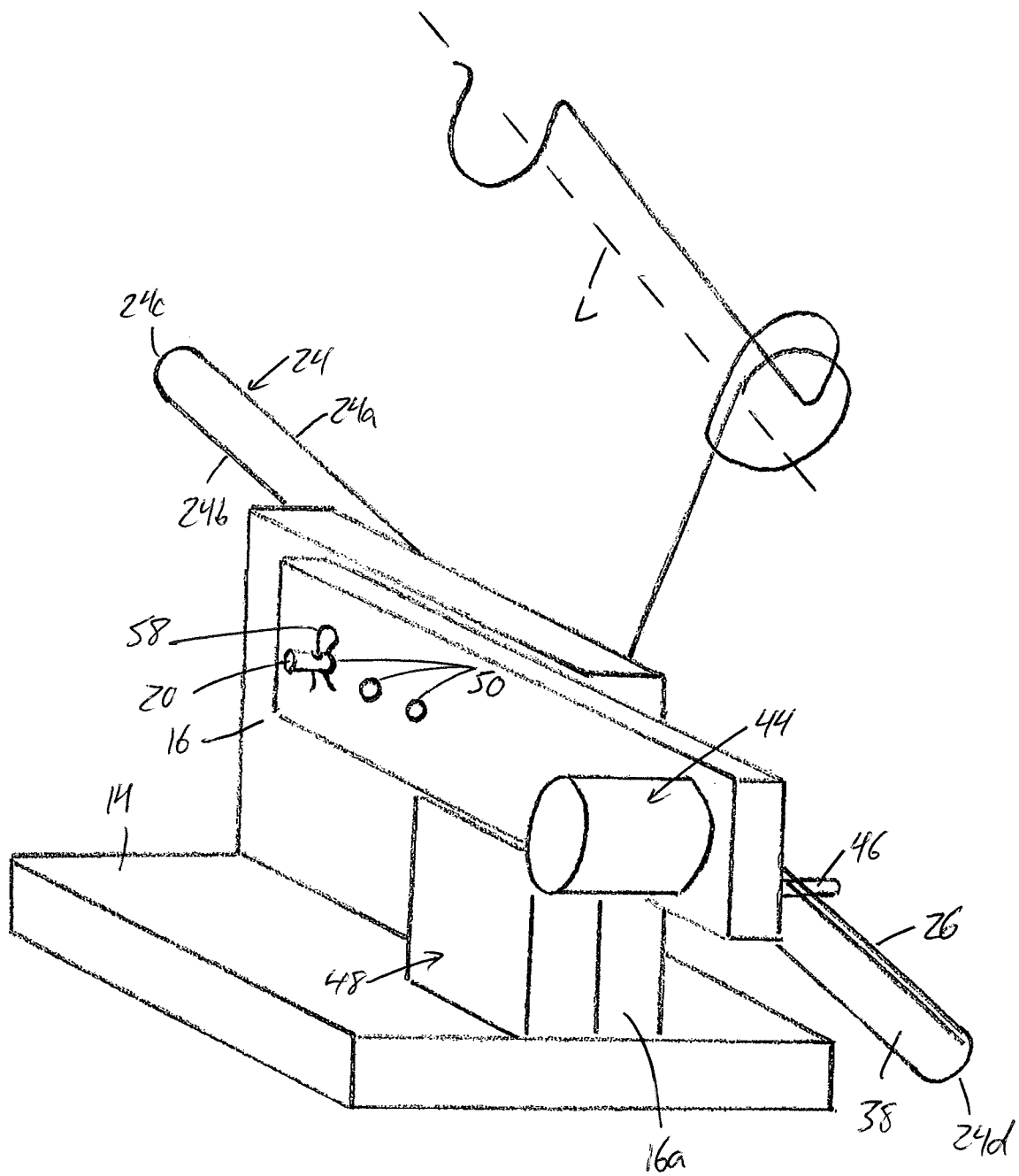
FIG. 3 is a rear left side rear left side perspective view of the first embodiment jigging device with the rod carrier's front end in an uppermost state of its normal operating cycle.

A stop block 40 is mounted atop the base panel 14 alongside the upright support wall 16 in parallel relation thereto on same side of the support wall 16 as the rod carrier 18. This stop block 40 limits the pivotal movement of the rod carrier to a predetermined range through contact of the stop block's upper edge with the lower linear span 24b of the rod carrier's lower loop 24. A front region 40a of the stop block's upper edge resides above the front end of the base panel 14 and is horizontally oriented, while a rear region 40b of the stop block's upper edge spans to the rear end of the block 40 and slopes downwardly toward the rear end of the base panel 14. The front region 40a resides in close elevation to the pivot pin 20 and clamping mechanism 22, whereby the front portion of the rod carrier's lower loop 24 cannot deviate significantly downward from a horizontal orientation. Accordingly, the lowermost attainable point of the rod carrier's pivotal range is a generally horizontal orientation. On the other hand, since the rear region 40b of the stop block's upper edge slopes downwardly under and past the pivot pin 20, the rear portion of the rod carrier's lower loop 24 can deviate downwardly past a horizontal orientation by a notable, but acute, oblique angle. Such lowering of the rear portion inversely raises the front end of the rod carrier's lower loop 24 into a forwardly inclined orientation of notable, but acute, angle, as shown in FIG. 3.

A motor carrier 42 in the form of an elongated block-shaped arm is pivotally pinned to the upright support wall 16 by the same pivot pin 20 as the rod carrier 18, whereby the motor carrier 42 and the rod carrier 18 are pivotable about the same horizontal pivot axis in parallel vertical working planes on opposite sides of the upright support wall 16. Both the rod carrier and the motor carrier are freely pivotable about the pin, as opposed to being fixed thereto, whereby the motor carrier and the rod carrier are pivotal independently of one another about the shared pivot axis. The motor carrier 42 reaches rearwardly along the respective side of the upright support wall 16 and past the rear end 16a thereof. Beyond the rear end of the support wall 16, the motor carrier 42 has an electric motor 44 mounted thereto on the outer side thereof opposite the support wall 16 near the rear end of the carrier. The motor carrier and the attached motor collectively form a removable motor unit that can be easily detached from the support frame by removal of a cotter or other lock pin 58 that passes diametrically through the pivot pin 20 via a cross-bore thereof on the outer side of the motor carrier 42.

From the motor housing the outer side of the motor carrier, a drive shaft of the motor passes horizontally through a hole in the motor carrier to an inner side thereof, where an eccentric pin 46 is affixed to the motor driveshaft in radially offset relation thereto such that driven rotation of the driveshaft by the motor causes the eccentric pin 46 to revolve on an orbital path around the rotational axis of the driveshaft. The eccentric pin 46 passes through the longitudinal slot 38 of the rod carrier's lower loop 24. The diameter of the eccentric pin's orbital path around the motor's rotational axis exceeds the width of the elongated slot 24 between the upper and lower linear spans 24a, 24b of the rod carrier's lower loop. As a result, operation of the motor will reciprocate the rear portion of the rod's carrier's lower loop 24 upwardly and downwardly about the pivot pin axis as the eccentric pin 46 orbits around the motor's rotational axis. This reciprocal pivoting of the rod carrier's rear portion by the motor's eccentric pin will drive reciprocation of the front portion of the rod carrier upwardly and downwardly about the axis of pivot pin 20, in synchronous but inverse relation to the rear portion of the rod carrier.

Accordingly, as the eccentric 46 moves through an upward half of its orbital path about the motor axis (i.e. from a bottom-dead-center directly beneath the motor's rotational axis toward the diametrically opposing top-dead-center position directly above the motor's rotational axis), the rear portion of the rod carrier is lifted upward, thus causing an opposing downstroke of the rod carrier's front portion toward the lowermost point of its travel range. Likewise, as the eccentric moves through a downward half of its orbital path about the motor axis (i.e. from the top-dead-center above the motor's rotational axis toward the diametrically opposing bottom-dead-center position beneath the motor's rotational axis), the rear portion of the rod carrier is lowered downward, thus causing an opposing upstroke of the rod carrier's front portion toward the uppermost point of its travel range.

Figure 2:
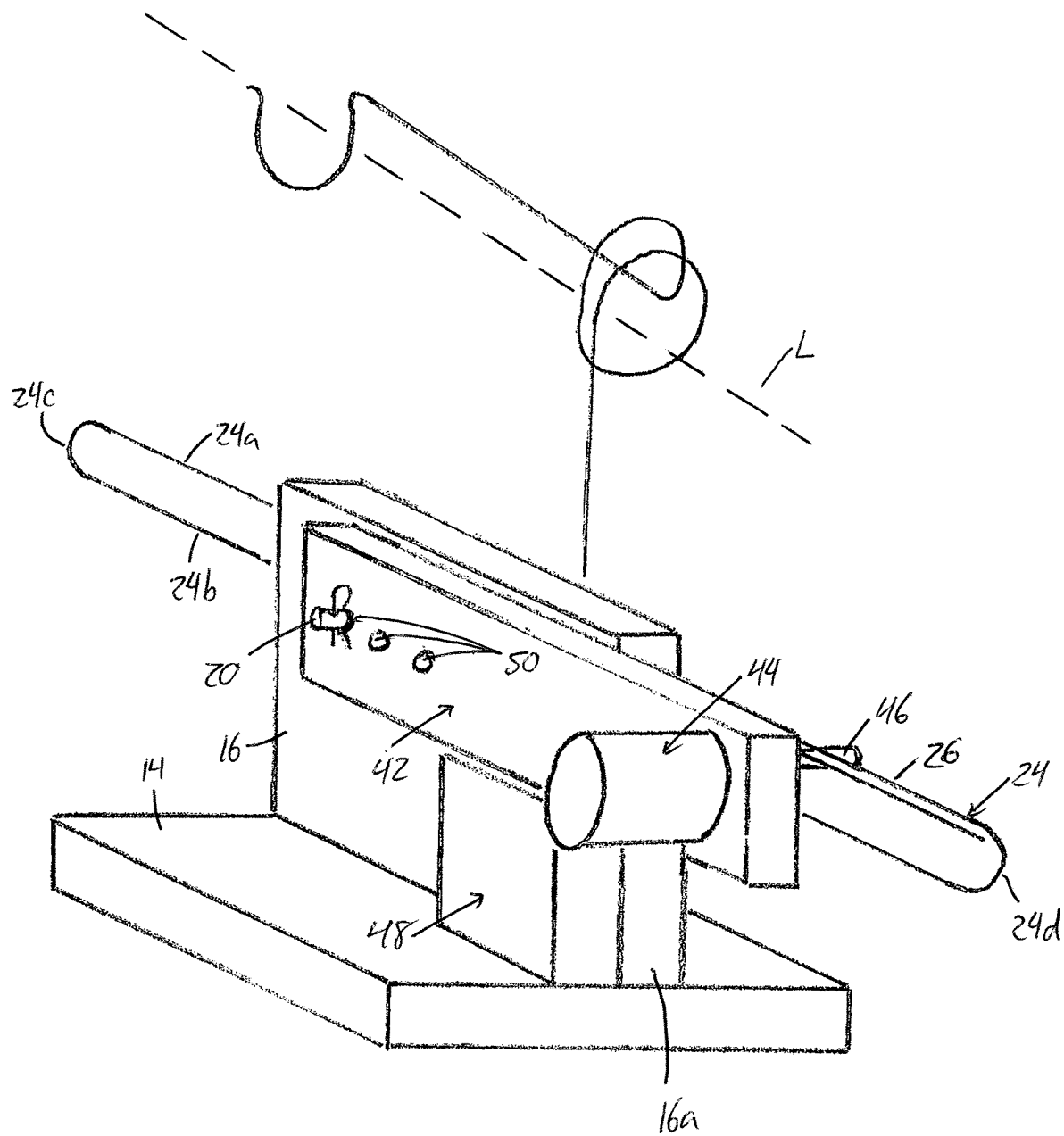
FIG. 2 is a rear left side perspective view of the first embodiment jigging device with the removable motor unit installed, and with a front end of its rod carrier at lowermost state of its normal operating cycle.

This describes a normal operating cycle of the device, where ongoing operation of the motor drives this reciprocal pivoting of the rod carrier, and thus likewise reciprocally pivots the fishing rod about the pivot pin axis, whereby the front portion of the rod carrier alternates between the raised position of FIG. 3 and the lowered position of FIG. 2, thus likewise jigging the front end of the fishing rod up and down about the pivot pin axis. During such normal operation, the motor carrier 42 remains at stationary rest in a horizontal orientation atop a support seat 48a on the same side of the support wall 16. As shown, this support seat 48a may be defined by a seat block 48 fixed atop the base panel beside the support wall 16, whereby the top edge of the seat block 48 defines a ledge-like seat spanning laterally out from the support wall at an elevation above the base panel 14 and below the pivot pin 20.

Once a fish strikes the bait on the fishing line, this caught fish will pull on the line and introduce tension to same, which thus pulls downwardly on the front end of the fishing rod. This downward force from the fishing line at the front end of the rod creates a downward moment about the axis of pivot pin on the front portion of the rod carrier, thus pulling the front portion of the rod carrier down into its lowered state. If the motor were mounted in a fixed stationary position relative to the support wall 16, the motor would be fighting against this down force D during the downward half of the eccentric's orbital path around the motor axis. However, the pivotal mounting of the motor carrier 42 overcomes this problem, and allows the motor to operate in a freewheeling mode that decouples the motor from this downward loading on the fishing rod's front end so that the motor operates independently of the rod carrier's held-down position.

Figure 4:
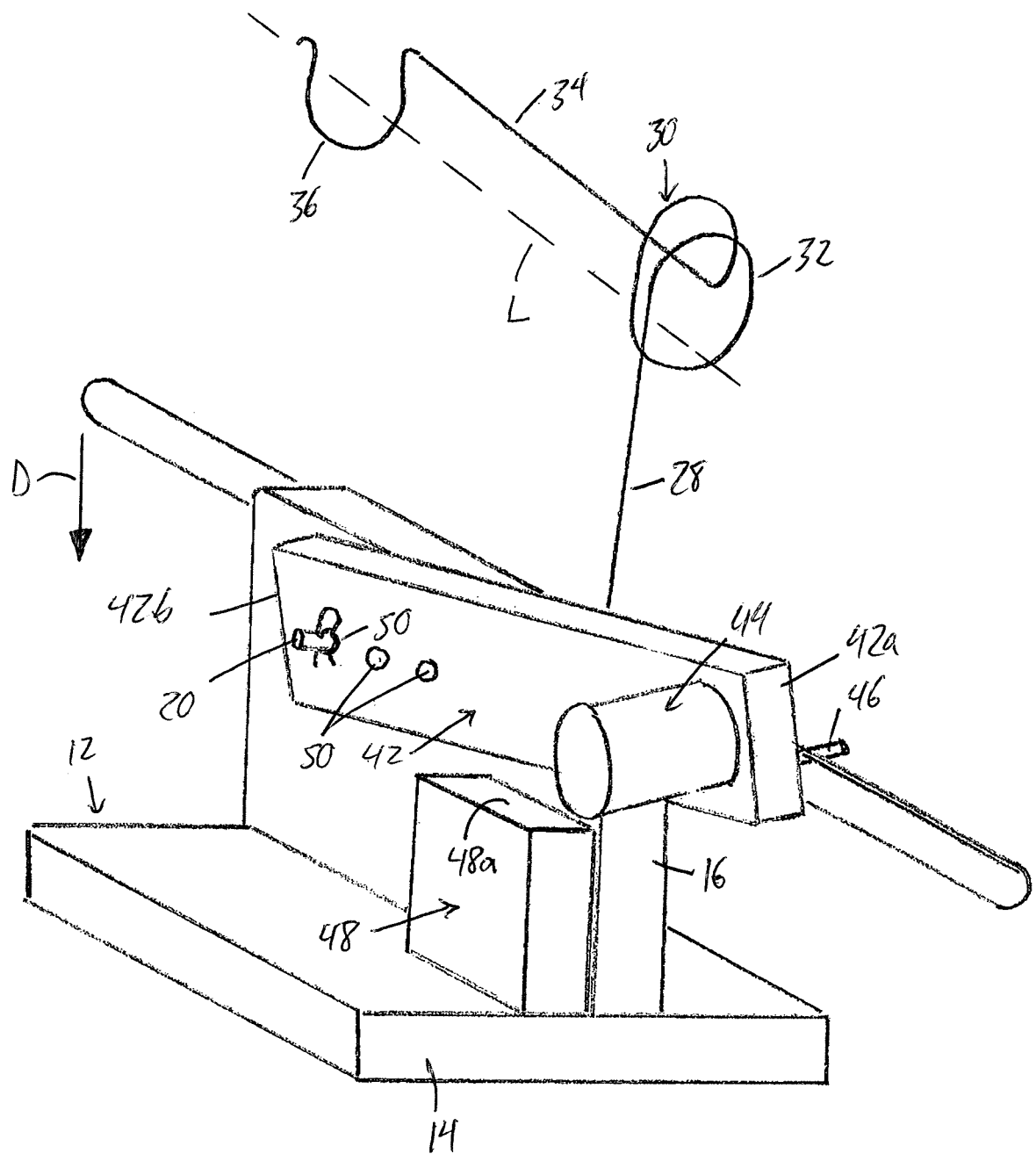
FIG. 4 is a rear left side rear left side perspective view of the first embodiment jigging device during freewheeling operation, where the rod carrier is held in its lowermost state due to line tension applied by a caught fish, but continued freewheeling operation of the motor is allowed due to pivotal mounting of the motor unit.

This freewheeling mode is best understood with reference to FIG. 4, where downforce D exists on the front end of the rod carrier due to the line tension induced by a caught fish. With the front end of the rod carrier held in its fully lowered position by this downforce D, the rear end of the rod carrier is likewise held in the uppermost position of its travel range by downforce D. FIG. 4 shows the eccentric 46 at its bottom-dead-center position in contact against the bottom linear span 24b of the rod carrier's lower loop 24. During normal operation, this would correspond to the raised position of the rod carrier's front end, i.e. the uppermost point of the jigging action. However, in freewheeling mode, where the downforce D holds the front end of the rod carrier down, the downward half of the eccentric's orbital path does not push the rear of the rod carrier downward, but instead lifts the motor 44 and the rear end 42a of the motor carrier 42 upwardly about the axis of pivot pin 20. That is, the moment created about the pivot pin axis by the caught-fish downforce D exceeds the opposing moment created about the pivot pin axis by the combined weight of the motor carrier 42 and motor 44. Accordingly, rather than driving the rear end of the rod carrier downward, the downward half of the eccentric's orbital path pivots the motor carrier 42 upward off the support seat 48, thus lifting the motor 44 along with it. Continued motion of the eccentric into the upward half of its orbit path under ongoing operation of the motor lowers the motor carrier 42 back down toward the seat 48a as the eccentric continues to ride atop the lower linear span 24b of the rod carrier's lower loop 24.

Accordingly, the jigging device 10 uses constrained but movable mounting of the motor 44 to the stationary support frame 12 to accommodate ongoing motor operation when a fish is caught and pulls the front end of the fishing rod and rod carrier 18 down into its lowered state.

In the present embodiment, the motor carrier 42 has multiple pin holes 50 therein for selective receipt of the pivot pin 20 through any of said pin holes during assembly of the device. The pin holes 50, may vary in quantity from the three-hole embodiment shown, are spaced apart in a longitudinal direction of the motor carrier 42 in a respectively radial direction from the motor axis. Accordingly, selection of which pivot pin hole 50 is used determines the effective radial arm distance from the pivot axis of the device to the motor axis. As a result, the amplitude of the jigging action can be varied by selecting between the different pivot pin holes 50. The drawings show use of a first foremost pivot pin hole nearest a front end 42b of the motor carrier 42, which results in a smallest jigging amplitude by placing the motor at the furthest available location relative to the pivot pin axis. Selection of the third rearmost pivot hole would result in the greatest jigging amplitude by placing the motor at the nearest available location relative to the pivot pin axis.

In order to minimize the loading of the motor during normal operation for the most energy efficient operation, the balance of the fishing rod and rod carrier about the pivot pin axis is adjustable. In the present embodiment, the same clamping mechanism 22 that holds the rod carrier 18 on the pivot pin 20 cooperates with the elongated slot 38 of the rod carrier's lower loop to define the balance adjustment mechanism. By loosening the clamping mechanism 22, the slotted rod carrier 18 is slidable back and forth across the pivot pin 20 to adjust the location along the slot 38 at which the rod carrier is retained on the pin when the clamping mechanism is tightened.

Figure 5:
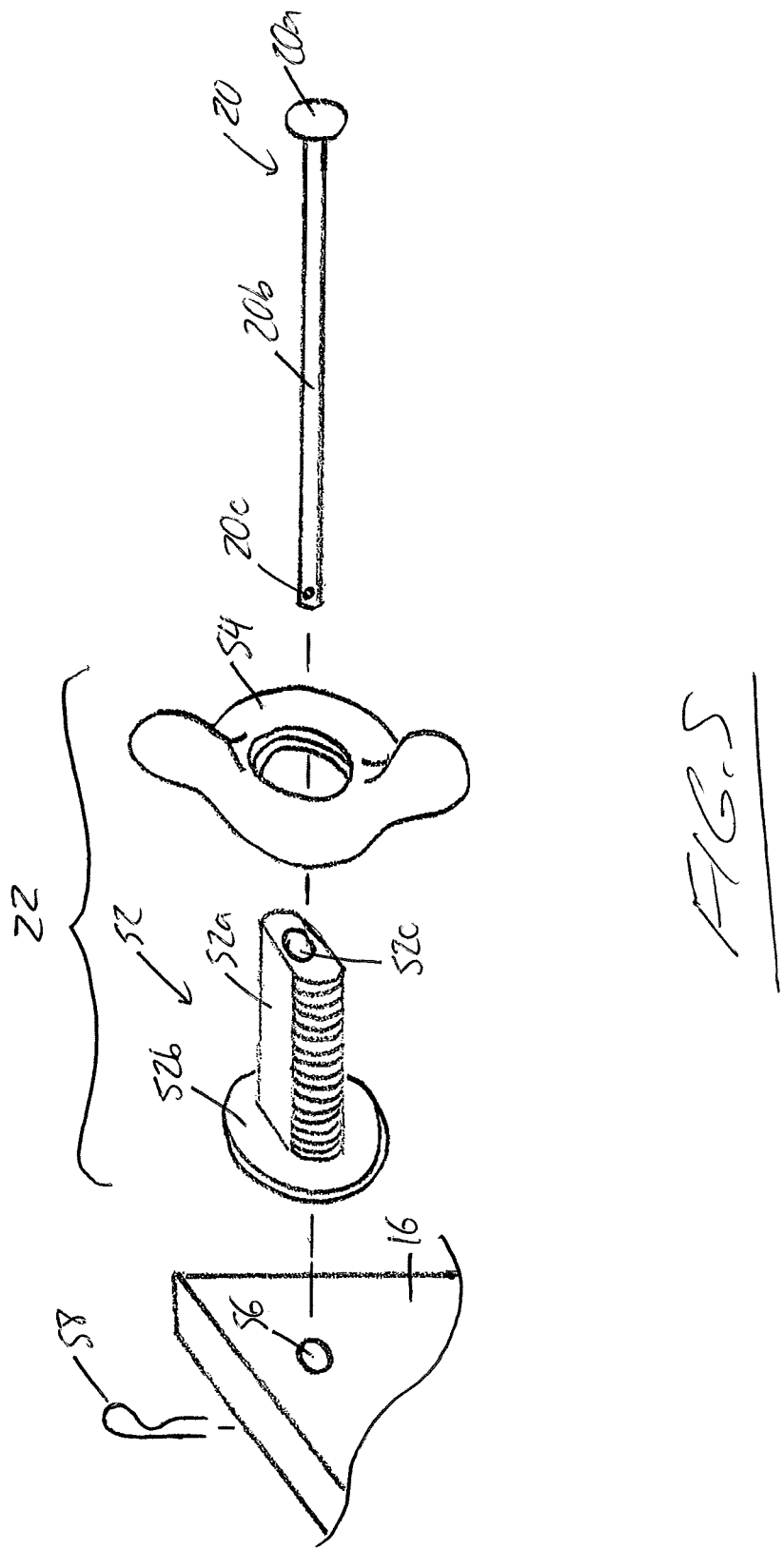
FIG. 5 is an exploded view of a pivotal connection by which the motor unit is pivotally coupled to a support frame of the first embodiment device.
Figure 6:
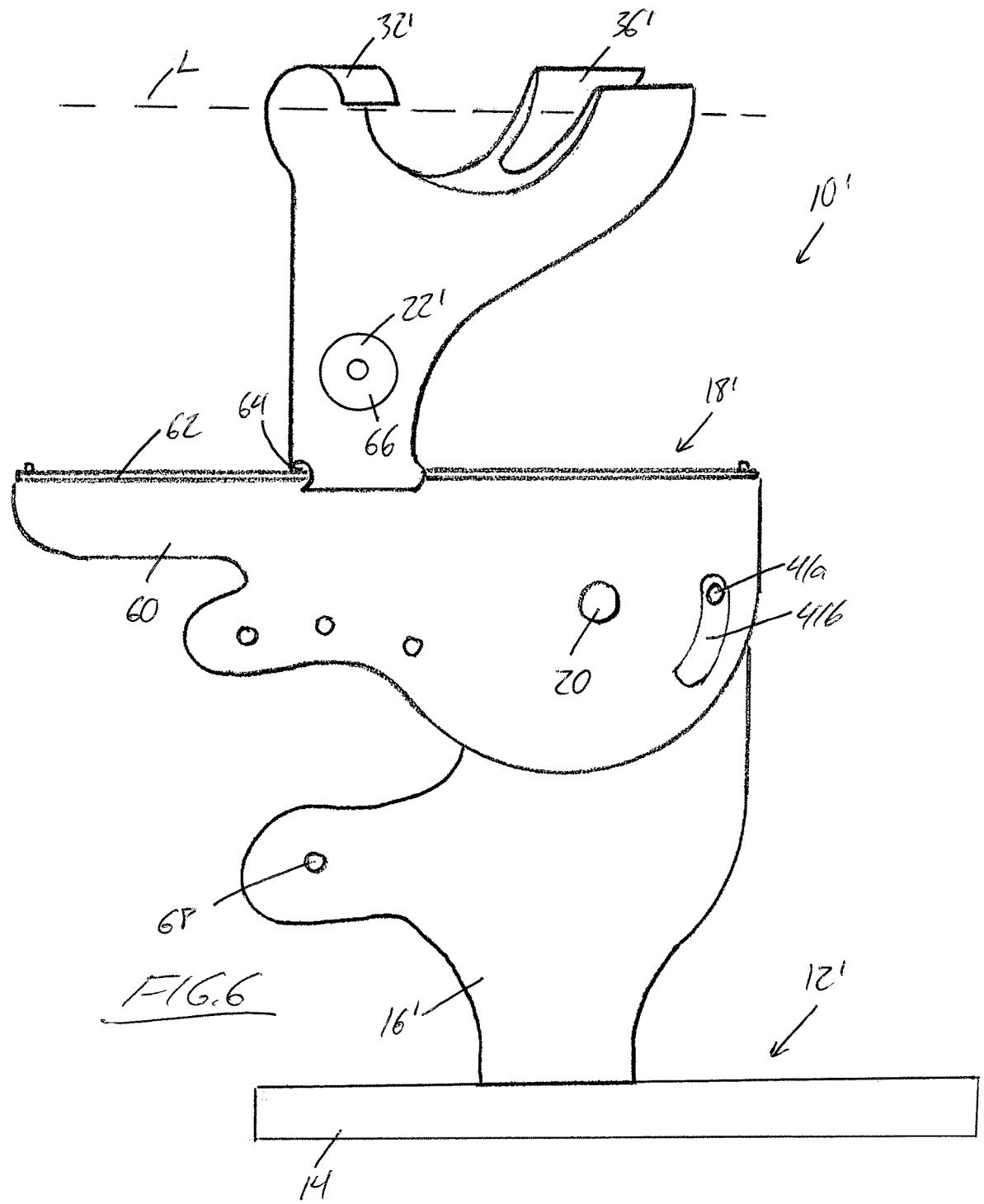
FIG. 6 is a right side elevational view of a second embodiment jigging device according to the present invention, prior to installation of the removable motor unit thereof.

As shown in FIG. 5, the clamping mechanism 22 features a bolt member 52 and a cooperating nut 54. The bolt member 52 features an externally threaded shaft 52a with an enlarged circular head 52b at one end, and an axial through-bore 52c passing centrally through the head and shaft. Due to the enlarged size of the bolt head relative to the bolt shaft, the underside of the bolt head defines an annular shoulder spanning radially outward from the bolt shaft. The internal threading of the nut 54 is of mating configuration to the external threading of the bolt shaft 52a. The bolt head 52b resides adjacent the upright support wall 16 on the same side thereof as the rod carrier 18, and the nut 54 is threaded onto the bolt shaft 52a from the side of the rod carrier 18 opposite the bolt head 52b so that the bolt shaft 52a reaches through the elongated slot 38 of the rod carrier's lower loop 24. Accordingly, advancing the nut 54 toward the bolt head clamps the upper and lower spans 24a, 24b of the rod carrier's lower loop 24 between the nut 54 and the shoulder of the bolt head 52b. The pivot pin 20 has a head 20a of greater diameter than the bolt's axial through-bore 52c, and this pin head 20a resides of the rod-carrier side of the support wall 16. The remainder of the pivot pin forms a rod 20b that passes through the axial-bore of the bolt 52c and onwardly through an aligned mounting hole 56 in the support wall 16. On the motor-side of the support wall 16, a cross-bore 20c in the pivot pin rod 20b receives the cotter or lock pin 58 to prevent withdrawal of the pin rod 20*b* back through the mounting hole 56. The lock pin 58 thus cooperates with the head 20*a* of the pin that blocks sliding of the pin in the other direction in order to normally hold the pivot pin axially in place. In the illustrated embodiment, the nut 54 is a wing nut that enables tool-free manual loosening and tightening of the clamping mechanism.

To first setup the device for use with a selected fishing rod, the motor carrier 42 is detached, if not already removed, by removing the lock pin 58 and sliding the motor carrier 42 off the pivot pin 20, and then replacing the lock pin 58 so as to keep the pivot pin in place on the support wall 16 to support the rod carrier 18. The handle of a fishing rod is inserted into the coil 32 of the rod holder section 30 and laid atop the cradle 36 thereof to fully support the fishing rod on the holder. In this installed position of the fishing rod, with the fishing reel hangs from the rod in front of the cradle 36 and the rod reaches forwardly from the rod holder section 30 on longitudinal axis L past the front end 24*c* of the rod carrier. With the clamping mechanism 22 in a tightened state retaining the rod carrier on the pivot pin 20, the front end 24*c* of the rod carrier is manually elevated (either directly or via the fishing rod) into an intermediate position between the raised and lowered positions. The rod carrier is released to check the overall balance of the rod and rod carrier on the pivot pin 20. If the rod and rod carrier tilt forwardly downward when released, this suggests they are too front-heavy relative to the pivot axis pin. To achieve a more balanced state, the clamping mechanism 22 is loosened, and the slotted lower loop 24 of the rod carrier is shifted rearward relative to the pivot pin 20 in order to move the center of mass of the rod and carrier combination rearwardly toward the pivot pin axis. The clamping mechanism is re-tightened at the selected new location along the elongated slot 38, and the balance is rechecked. If the rod and carrier combination tilts rearwardly downward when released, this suggests it is too rear-heavy relative to the pivot pin axis, in which case the clamping mechanism 22 is re-loosened and the rod carrier 18 is shifted forwardly before re-tightening the clamp.

Once the rod and carrier combination tends to remain stationary when released at the intermediate position, i.e. doesn't tilt in either direction when released, this denotes a properly balanced position on the pivot pin. The motor carrier is then installed back on the pivot pin, during which the motor eccentric is inserted into the slot of the rod carrier's lower loop 24. With the device balanced, the load faced by the motor at any given time is relatively small, needing only to overcome the minor weight imbalance introduced by the slight tilting of the rod hold in either direction from its intermediate balanced position. With the weight of the rod and carrier combination being distributed across the pivot axis in a balanced manner, the motor never experiences the full weight load of the rod and carrier combination. By comparison, if the rod and carrier combination were imbalanced, with an entirety or substantial majority of the total weight of the rod and carrier combination being situated to one side of the pivot axis to make the combination either front or rear heavy, the motor would experience significant loading every half cycle of its operation. The balancing of the unit provides for smoother, more efficient operation and improved battery and wear life.

FIGS. 6 to 9 illustrate a second embodiment jigging device 10' that similarly features a support frame 12 with a horizontal base panel 14 and a vertically upright support wall 16 that stands atop same and pivotally supports a rod carrier 18' via a horizontal pivot pin 20 passing through the vertical support wall 16 and the rod carrier 18'. The rod carrier 18' in this embodiment is not a wireframe unit, and instead has a two-part construction featuring a lower base 24' and a separate rod holder 30' selectively attachable thereto in a removable manner by a clamp mechanism 22'. In the illustrated embodiment, the base 24' of the rod carrier features a planar plate-like main body 60 residing in a first vertical working plane beside the upright support wall 16', and a bar 62 rigidly fastened onto an upper edge of the main body 60 in a plane perpendicular thereto. The bar 62 spans the full length of this upper main body edge and slightly overhang the edge on both sides thereof.

The rod holder 30' is a clamp-on molded plastic fishing rod holder of a commercially available type, where the upper end of the rod holder 30' is configured with an upward opening cradle or yoke 36' at a front end of the rod holder 30' and an over-arching brace 32' at the rear end of the rod holder 30', where the free rear end of the fishing rod handle is inserted downwardly and rearwardly through the space between the cradle and the brace to reach past the brace, and then a front portion of the handle just behind the reel is lowered into seated condition in the cradle. The weight of the reel and the bulk of the rod in front of the cradle creates a downward moment at this front portion of the rod, thus forcing the rear portion of the rod handle up against the brace, thereby establishing a fully secured position of the rod in which it spans forwardly along a longitudinal axis L that bisects the cradle and defines the radial center of the over-arching brace.

The bottom of the rod holder 30' has a channel 64 running longitudinally therethrough in a directional parallel to longitudinal axis L, and this lower portion of the rod holder is split into two halves, each reaching downwardly over the bar-equipped top edge of the rod carrier's main body on a respective side thereof. A clamping mechanism 22' of the second embodiment features an actuation knob 66 on the split lower portion of the rod holder's body that is operable to clamp the two halves of the holder 30' together when rotated in a tightening direction. This tightening action forces the two halves of the rod holder's channeled lower end against opposing sides of the bar 62 on the main body 60, thus locking the rod holder 30' to the main body 60 of the rod carrier 18'. When the clamp knob 66 is loosened, this releases the clamping action of the rod holder on the bar, whereupon the rod holder can be slid back and forth along the bar to any selectable location therealong to adjust the position of the rod holder in the longitudinal direction. The bar 62 thus defines a track along which the rod holder is slidably movable when the clamping knob is in its loosened state. While the illustrated embodiment features a bar or rail mounted atop the main body of the rod carrier base to define this track, in other embodiments the upper edge of the main body itself may serve as the track if it's of suitable size and shape to mate with the channeled lower end of the rod holder 30'. So whereas the first embodiment moved an entirety of the rod carrier relative to the pivot axis to effectively relocate the pivot point to a different location on the rod carrier, the second embodiment instead employs a two part rod carrier where the rod holder part of the carrier is movable relative to a base part of the carrier, and the base is pivotally mounted to the support frame at a fixed, predetermined pivot point.

In either embodiment, the position of the supported fishing rod is adjustable in the forward-rearward direction of the jigging device to adjust the balance of the rod and carrier combination about the pivot pin 20. So like in the first embodiment, the rod is placed in the holder 18', and if the rod and carrier are front or rear heavy, the clamping mechanism 22' is loosened and the fishing rod holder is shifted rearward or forward accordingly until a balanced state is achieved, at which point the clamp is re-tightened to lock the longitudinal position of the rod holder relative to the pivot pin 20.

The second embodiment once again features a motor carrier 42' movably connected to the upright support 16' of the support frame 12', but the motor carrier in this embodiment does not share the same pivot pin 20 as the rod carrier. Instead, a horizontal motor support pin 68 fixed to the upright support wall 16 juts laterally outward therefrom to a side thereof opposite the main body of the rod carrier at a location rearward and downward from the pivot pin 20. The block-shaped motor carrier 42', instead of multiple pivot pin holes 50, features a singular slot 50' extending longitudinally into a bottom end of the carrier 42'. The slot 50' has a width slightly exceeding the diameter of the motor support pin 68 to enable sliding receipt of the motor support pin 68 within said slot 50.

Figure 7:
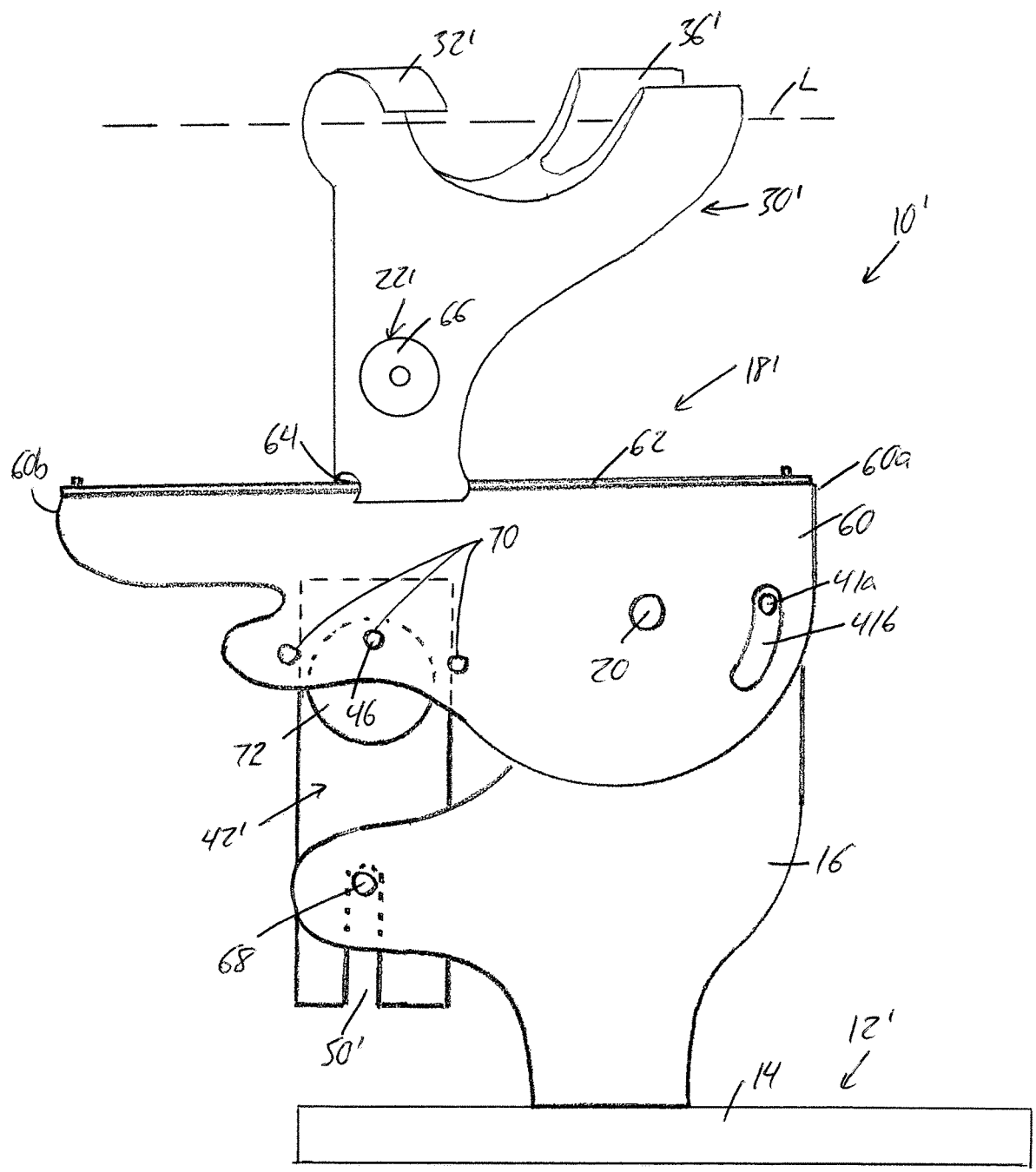
FIG. 7 is a right side elevational view of the second embodiment jigging device with the removable motor unit installed, and with a front end of its rod carrier at the lowermost point of its normal operating cycle.
Figure 8:
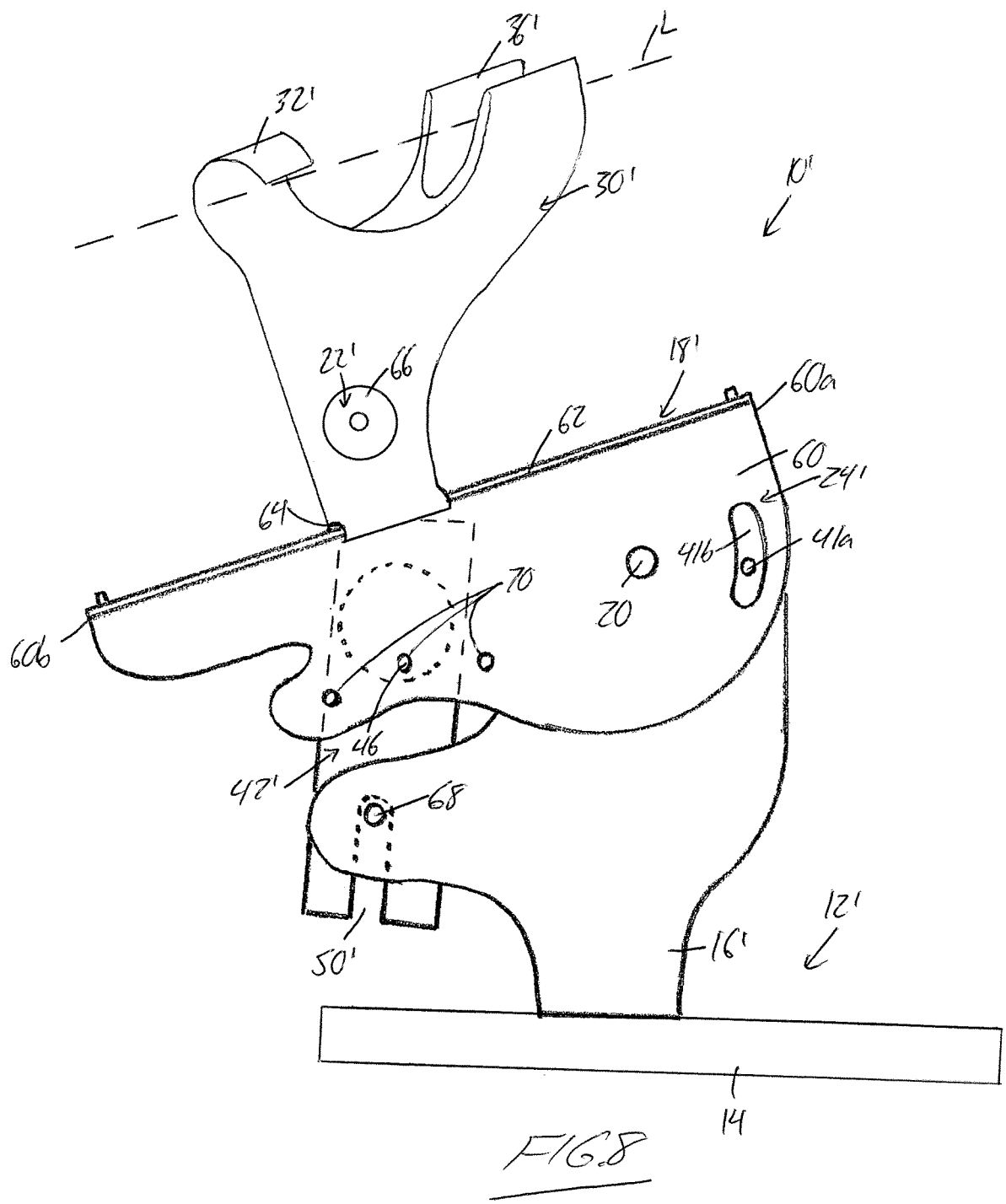
FIG. 8 is a right side elevational view of the second embodiment jigging device with the rod carrier's front end at the uppermost point of its normal operating cycle.
Figure 9:
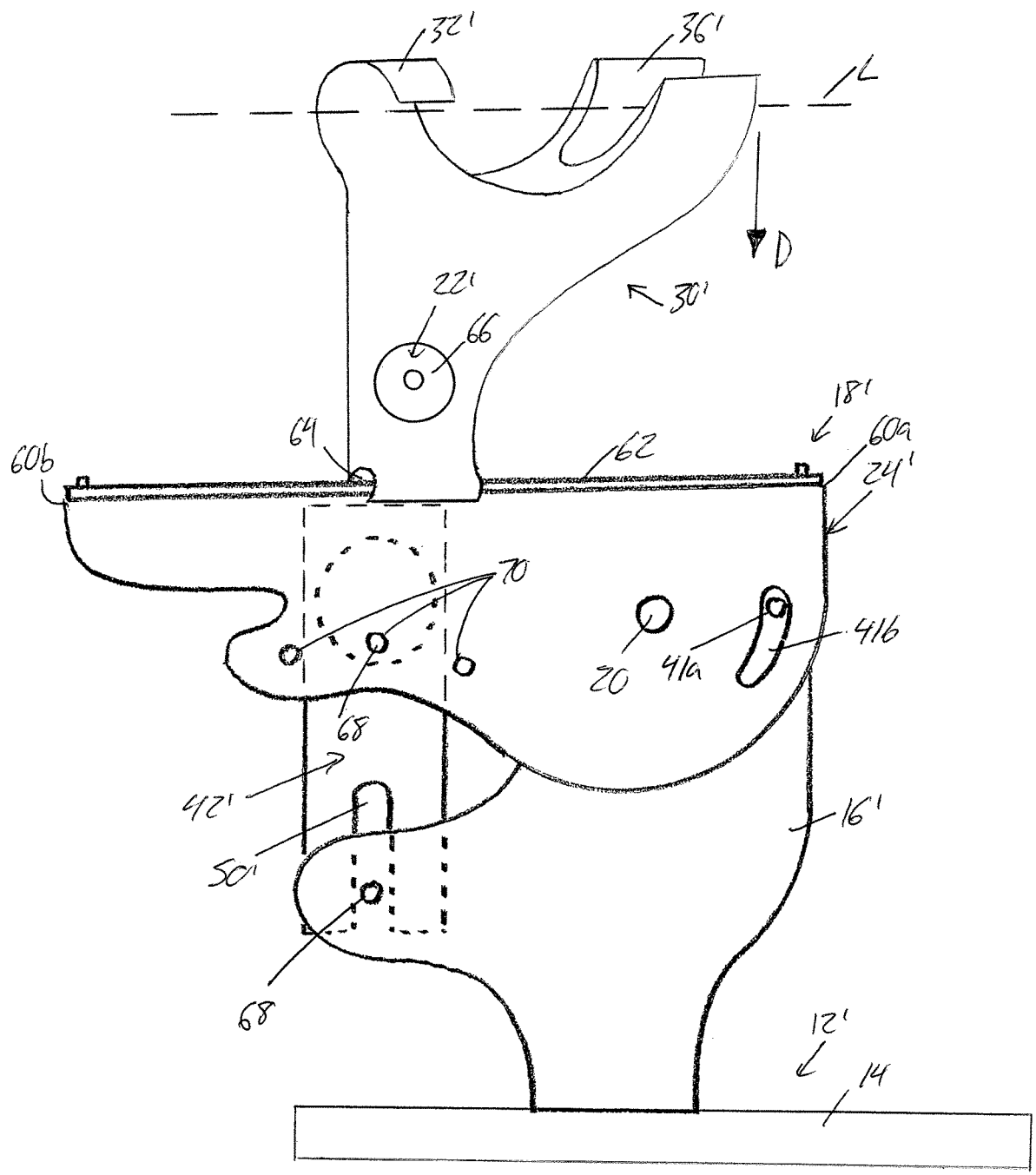
FIG. 9 is a right side elevational view of the second embodiment jigging device during freewheeling operation.
Figure 10A:
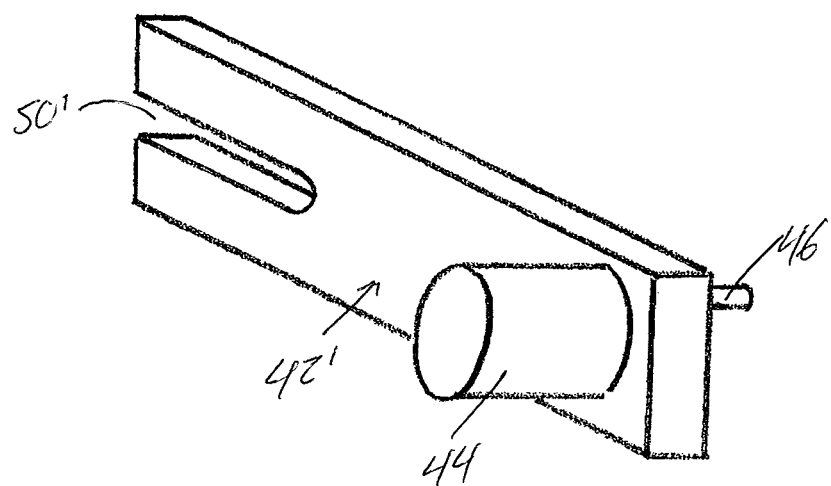
FIGS. 10A and 10B are perspective views of the removable motor unit of the second embodiment from opposing sides thereof.
Figure 10B:
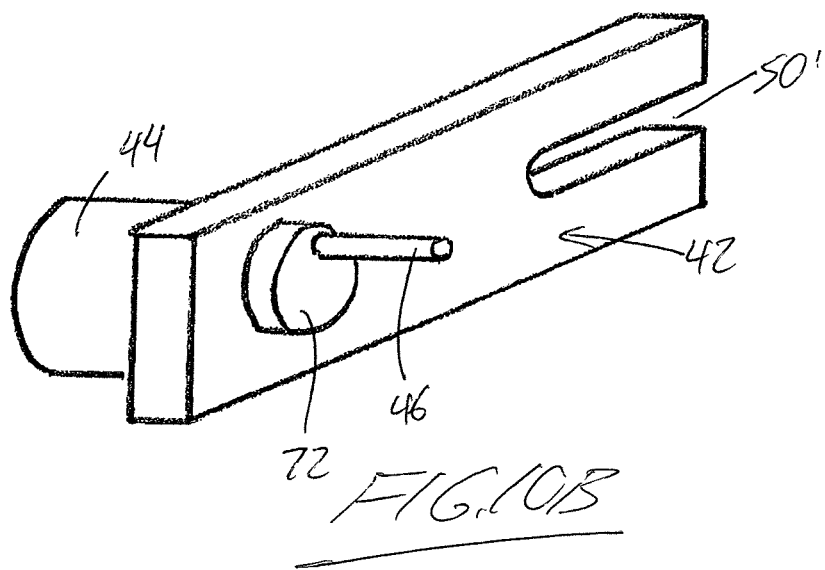

As shown in FIGS. 7 to 9, with its slot 50' engaged over motor support pin 68, the motor carrier 42' stands upright from this pin-slot engagement to a rear portion of the rod carrier's main body 60, where the main body 60 features a set of multiple motor-coupling holes 70 each sized for selective receipt of the motor's eccentric pin 46 therein. Like in the preceding embodiment, the motor carrier has the motor housing mounted to an outer side thereof, and the motor driveshaft 72 passes through the motor carrier 42' to an opposing inner side thereof, where the eccentric pin 46 is affixed to the driveshaft 72 in a radially offset manner from the motor axis on which the driveshaft is centered and rotatable. The eccentric pin 46 is received in one of the three motor coupling holes 70 of the rod carrier's main body 60, whereby rotation of the motor driveshaft causes orbiting of the eccentric pin 46 around the motor axis, thereby reciprocating the rear portion of the rod carrier up and down to drive the inverse reciprocal motion of the rod carrier's front portion.

FIGS. 7 and 8 illustrate the second embodiment in the normal operating mode driving reciprocal upward and downward pivoting of the rod carrier's front end 60a. FIG. 7 shows the front end 60a of the rod carrier in its lowered position corresponding to the top-dead-center position of the motor eccentric 46 at the rear portion of the rod carrier, while FIG. 8 shows the front end 60a of the rod carrier in its raised position corresponding to the bottom-dead-center position of the motor eccentric 46.

Whereas the maximum attainable pivotal range of the rod carrier in the first embodiment was limited in both directions by stop block 40, the pivotal range in the second embodiment is instead limited by a stop pin 41a jutting laterally out from the upright support 16' into an arcuate slot 41b in the main body 60 of the rod carrier. The arcuate curvature of the slot 40b is centered on the pivot pin axis to allow the relative pivotal motion between the rod carrier 18' and the upright support 16, while contact of the stop pin 41a with the opposing ends of the arcuate slot 41b determines the uppermost and lowermost attainable positions of the rod carrier's front end, thus setting the maximum possible jigging amplitude attainable with the device. Selection from among the three motor coupling holes 70 for receipt of the motor eccentric 46 enables selection from among different possible jigging amplitudes, as the three motor coupling holes 70 are situated at different distances from the pivot pin 20 in the longitudinal direction of the rod carrier's main body, each thus corresponding to a different radial arm distance from the motor eccentric to the pivot pin axis. So while the first embodiment allows selection of a jigging amplitude by selecting from different mounting points for the motor carrier on the upright support, the second embodiment instead uses selection from among different eccentric-accommodating drive points on the rod carrier 18'.

In the first embodiment, the motor carrier lies generally longitudinally of device and is constrained to purely pivotal motion as a result of being pivotally pinned to the support frame by the same pivot pin 20 as the rod carrier. In the second embodiment, the motor carrier 42' is again movable in a constrained manner relative to the support frame, but has more degrees of freedom, instead being able to under go both pivotal rotation and radial sliding on the motor support pin 68. On the other hand, in the second embodiment, the motor eccentric 46 is more constrained relative to the rod carrier than in the first embodiment. Instead of being received in an elongated slot in which the orbital path of the eccentric moves in both longitudinal and width directions of the slot, the eccentric in the second embodiment is constrained within a small round motor coupling hole 70 of only slightly greater diameter than the eccentric pin itself. Accordingly, the eccentric in the second embodiment engages the rod carrier at a fixed, predetermined position thereon.

So whereas the first embodiment enabled freewheeling operation of the motor when a fish is caught through a singular degree of freedom at the connection between the motor carrier and the support frame, and multiple degrees of freedom at the connection between the motor eccentric and the rod carrier, the second embodiment instead uses multiple degrees of freedom at the motor carrier's connection to the support frame to allow freewheeling operation of the motor. FIG. 9 illustrates this mode of operation, where downforce D created on the front portion of the rod holder 30' via line tension from a caught fish holds the front end of the rod carrier down, but the sliding interface between the slotted motor carrier 42' and the motor support pin 68 of the support frame 12' accommodates ongoing operation of the motor by allowing the motor carrier 42' and attached motor to slide upwardly relative to the upright support 16 as the motor eccentric 46 moves through the downward half of its orbital cycle, and slide back downward as the motor eccentric moves onward through the upward half of its orbital cycle. All the while, in both freewheeling and normal operation, the motor carrier is also pivotable forward and backward on the motor support pin 68 to accommodate the horizontal component of the eccentric's orbital motion. In normal operation, during the downstroke of the rod, the upward orbital travel of the motor eccentric 46 causes the motor carrier 42' to push downward against the motor support pin 68 at the closed end of the motor carrier slot 50'. During the upstroke of the rod carrier in normal operation, the weight of the motor itself is pushing downwardly on the rear half of the rod carrier, thus aiding the lifting actin on the front half of the rod carrier. Accordingly, the motor coupled to the rear portion of the rod carrier behind the pivot pin 20 serves as a counterweight to the front portion of the rod and rod carrier that resides forwardly of the pivot pin, whereby the motor weight reduces the operational load experienced by the motor during this half of the operating cycle.

In summary, both of the forgoing embodiments share the unique use of a motor that movably coupled to the support frame to accommodate ongoing operation of the motor in a freewheeling state when a fish is caught, and the unique use of a balance adjustment mechanism to obtain a balanced state of the rod carrier and supported rod in order to minimize loading of the motor and provide smooth, efficient operation.

FIGS. 11 through 16 illustrate a third embodiment jigging device 10" similar to the first embodiment, in that it features a rod carrier 18" pivotally carried on an upright 16" support of a support frame 12", a motor carrier 42" also pivotally carried on the upright support 16", and an eccentric pin 46" carried on the motor's driveshaft and engaged in a longitudinal slot 38" of the rod carrier 24".

Similarities to the second embodiment are also included in the third embodiment, in that the rod carrier 18" has a lower base 24" on which a separate rod holder 30" is adjustably mounted to control the balance of the rod and carrier combination about the pivot axis P, but instead of a bar or rail, the track along which the rod holder 30" slides is instead an elongated adjustment slot 62" in the lower base 24" of the rod carrier 18". The adjustment slot 62" runs along a top perimeter edge of the rod carrier's lower base 24'. The clamping mechanism 22" for securing the rod holder 30" in place features an actuation knob 66 with a threaded rod 66a that passes through the two halves of the rod holder's bifurcated lower portion via the adjustment slot 62". The threaded rod 66a mates with a compatible nut 67 on the side of the rod holder opposite the clamp actuation knob 66 in order to clamp the two halves of the rod holder's bifurcated lower portion against respective sides of the rod carrier's lower base 24", thereby securing the rod holder 30" in the selected position along the adjustment slot 62".

The support frame 12" is of a different style than the earlier embodiments, being a bent wireframe outlining a rectangular base 14", at a rear end of which the wireframe is bent upwardly to create the upright support 16" on which the motor and rod carriers 42", 18" are pivotally supported. The same wireframe has a ninety-degree bend at the top of the upright support 16" from which the wireframe extends in horizontally parallel relation to the underlying rear end of the base 14' to form a seat bar 48", from which the wireframe is bent again to form an inclined support bar 100 that reaches toward the opposing front end of the base 14' at an upwardly inclined angle. At a distal end of the inclined support bar 100, a final segment of the wireframe lies parallel to the seat bar 48" to define the pivot pin 20" on which the lower base 24" of the rod carrier 18" is mounted.

The pivot pin 20" passes through the lower base 24" of the rod carrier 18" via a pin hole 50 near the front end thereof, which in the illustrated embodiment resembles the head of a fish whose tail defines the opposing rear end of the rod carrier's lower base 24". The longitudinal slot 38" in the rod carrier's lower base 24" is situated approximately mid-way between the front and rear ends thereof, and spans only a fractional length thereof to accommodate relative movement of the motor's eccentric pin 46" during its orbital movement about the motor driveshaft.

The motor carrier 42" in the third embodiment is a two-piece plastic molded housing feature two shells 43a, 43b that are fastened together by threaded screw fasteners 43c. When mated together, the housing shells 43a, 43b form a hollow cylindrical hub 102 in which the motor 44" is housed at the rear end 42b of the motor carrier 42", and a support arm 104 that emanates radially outward from the hub so that a distal end of this arm 104 defines the opposing front end 42a of the motor carrier. Near this front end 42a, the side of the motor carrier 42" facing the lower base 24" of the rod carrier 18" features a pair of hollow cylindrical collars 106 whose hollow internal bores define respective pivot pin holes of the motor carrier. The free end of the wireframe's pivot pin 20" is receivable in either pivot pin hole of the motor carrier through the pin hole 50 in the rod carrier's lower base 24" in order to pivotally support the motor carrier 42" on the pivot pin 20" on the side of the rod carrier 18" opposite the inclined support bar 100.

The support arm 104 of the motor carrier reaches rearwardly from the pivot pin 20" past the seat bar 48", behind which the motor-containing hub 102 of the motor carrier 42" resides. During the normal mode of operation before a fish is caught on the fishing line, a contact point on the underside of the motor carrier's support arm 104 near the hub 102 rests upon the seat bar 48", while the orbital movement of the motor's eccentric pin 46" in the elongated slot 38" will reciprocally pivot the rod holder 18" up and down on the pivot pin 20. As shown in FIG. 15, a fishing rod 200 whose handle 202 is received in the rod holder 30" reaches forwardly beyond the front end of the rod holder, whereby the reciprocal pivoting of the rod carrier 18" jigs the forward tip 204 of the fishing rod, and the fishing line 206 hanging therefrom, up and down on an ongoing basis until a fish is hooked on the line 206. The two pivot pin holes defined in the collars 106a, 106b of the motor housing are situated at different radial distances from the rotational axis R of the motor's driveshaft, whereby selection from among these two pivot pin holes for receipt of the pivot pin 20" during assembly of the device will change the location of the pivot axis P relative to the motor's rotational axis, and thus change the amplitude of the jigging action created by the motor during the normal mode of operation.

Turning to FIG. 16, when a fish is caught and the line 206 is pulled taught, this tips down the front end of the rod carrier and holds it in this lowered state, whereupon the device begins operating in the above described freewheeling mode, where the orbital travel path of the motor's eccentric pin 46" constrained in the elongated slot 38" will instead periodically lift the contact point of the motor carrier 42" up off the seat bar 48", thus lifting up the hub 104 and motor 44" at the rear end of the motor carrier. In this embodiment, the bent wireframe defines the entire frame 12" of the device, including the base 14", the upright 16" and the seat 48" on which the motor carrier normally rests, while also defining the pivot pin 20" by which the rod and motors carriers 18", 42" are pivotally carried on the upright support 16".

FIG. 17 illustrates a fourth embodiment jigging device, which differs from the third embodiment only in that the motor driveshaft has a lobed cam track member 108 carried thereon instead of the eccentric pin of the preceding embodiments, and the lower base 24" of the rod carrier 18' has a cam follower pin 110 that projects laterally therefrom instead of the elongated slot 38" of the third embodiment. The follower pin 110 projects from the side of the rod carrier that faces the motor carrier, and reaches into the cam track member 108. The cam track member 108 revolves around the rotational axis R of the motor driveshaft during operation of the motor, and constrains the follower pin 110 to a lobe-shaped eccentric pathway 108a around the rotational axis R of the motor driveshaft. This constrained pathway followed by the follower pin is delimited between an outer wall 108b of the cam track member and a central core 108c of the cam track member that is fixed to the motor driveshaft. The cam track member and follower pin cooperate to provide the jigging action of the rod carrier during the normal mode of operation described above, while likewise also allowing the freewheeling mode of operation once a fish is hooked on the line.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A powered jigging device comprising:
   a support frame;
   a rod carrier having, or being configured to receive, a fishing rod thereon in a position reaching along a longitudinal axis, said rod carrier being pivotally mounted to the support frame for upward and downward pivoting of the rod carrier in a first working plane about a pivot axis transverse to the longitudinal axis, whereby the pivoting of the rod carrier jigs a fishing line of said rod up and down;
   a motor carrier movably coupled to the support frame in a manner allowing constrained motion relative thereto in a second working plane parallel to said first working plane;
   a motor mounted to said motor carrier;
   an eccentric coupled to an output of the motor for driven revolution of said eccentric about a rotational axis of said motor;
   wherein the eccentric is engaged with a mating feature on the rod carrier at a position radially spaced from the pivot axis such that said driven revolution of the eccentric normally pivots the rod carrier upward and downward about said pivot axis, while the available constrained motion between the motor carrier and the support frame accommodates ongoing operation of the motor when a caught fish pulls a front end of the rod carrier into a lowered position via tension in the fishing line.

2. The device of claim 1 comprising a balance adjustment mechanism on the rod carrier by which the fishing rod is relocatable relative to the pivot axis to achieve a balanced state of the rod carrier and the fishing rod about the pivot axis.

3. The device of claim 1 wherein at least a portion of the rod carrier is relocatable relative to the pivot axis to achieve a balanced state of the rod carrier and the fishing rod about the pivot axis.

4. The device of claim 1 wherein the rod carrier comprises a base member carrying the mating feature with which the eccentric is engaged, and a rod holder carried by the base, the rod holder being relocatable to and lockable at different positions on the base to relocate the fishing rod along the longitudinal axis.

5. The device of claim 4 wherein the base of the rod carrier comprises a track along which the rod holder is slidable, and the rod holder comprises a clamp operable to releasably clamp the rod holder to the base of the rod holder at selectable locations along said track.

6. The device of claim 1 wherein the eccentric comprises an eccentric pin and the mating feature of the rod carrier comprises an opening the rod carrier in which the eccentric pin is received.

7. The device of claim 6 wherein the opening in the rod carrier is an elongated slot.

8. The device of claim 1 wherein the motor carrier is pivotally coupled to the support frame for pivotal movement about the same pivot axis as the rod carrier.

9. The device of claim 8 wherein the motor carrier is constrained to only said pivotal movement.

10. The device of claim 1 in combination with said fishing rod, wherein said rod carrier and said fishing rod are balanced about said pivot axis to minimize loading of the motor during said normal upward and downward pivoting of the rod carrier.

11. The device of claim 1 wherein the support frame comprises a bent wireframe, integral sections of which define a base, an upright support standing upright from said base, and a pivot pin on which the rod carrier is pivotally received.

12. The device of claim 11 wherein the motor carrier is pivotally received on the same pivot pin as the rod carrier.

13. The device of claim 11 wherein the bent wireframe also defines a support bar on which the motor carrier is normally seated.

14. The device of claim 1 wherein the eccentric comprises a cam track member that defines a constrained pathway around the rotational axis of the motor, and the mating feature on the rod carrier is a follower engaged in the constrained pathway of said cam track member.

15. A method of using the device and fishing rod of claim 1 comprising:
   balancing the fishing rod and the rod carrier into a balanced state about the pivot axis;
   operating the motor to perform said upward and downward pivoting of the rod carrier to thereby pivot the fishing rod up and down and jig the fishing line, during which the balanced state minimizes operational loads on the motor.

16. The method of claim 15 further comprising, on catching a fish, which introduces a tensioned state to the fishing line that pulls the front end of the rod carrier down into the lowered position, using relative movement between the motor carrier and the support frame to accommodate ongoing operation of said motor while the lowered position of the rod carrier is held by the tensioned state of the fishing line.

17. A method of using the device and fishing rod of claim 1 comprising operating the motor to perform said upward and downward pivoting of the rod carrier to thereby pivot the fishing rod up and down and jig the fishing line until a fish is caught, which introduces a tensioned state of the fishing line that pulls the front end of the rod carrier down into the lowered state, and using relative movement between the motor carrier and the support frame to accommodate ongoing operation of said motor while said lowered state of the rod carrier is held by the tensioned state of the fishing line.

* * * * *